(12) United States Patent
Bang et al.

(10) Patent No.: US 10,681,378 B2
(45) Date of Patent: *Jun. 9, 2020

(54) METHOD FOR ENCODING AND DECODING VIDEO INCLUDING PLURALITY OF LAYERS

(71) Applicants: Electronics and Telecommunications Research Institute, Daejeon (KR); University-Industry Cooperation Group of Kyung Hee University, Yongin-si (KR)

(72) Inventors: Gun Bang, Daejeon (KR); Gwang Soon Lee, Daejeon (KR); Nam Ho Hur, Daejeon (KR); Kyung Yong Kim, Suwon-si (KR); Young Su Heo, Suwon-si (KR); Gwang Hoon Park, Seongnam-si (KR); Yoon Jin Lee, Yongin-si (KR)

(73) Assignees: Electronics and Telecommunications Research Institute, Daejeon (KR); University-Industry Cooperation Group of Kyung Hee University, Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/058,117

(22) Filed: Aug. 8, 2018

(65) Prior Publication Data

US 2018/0352256 A1 Dec. 6, 2018

Related U.S. Application Data

(63) Continuation of application No. 14/901,766, filed as application No. PCT/KR2014/005907 on Jul. 2, 2014, now Pat. No. 10,080,037.

(30) Foreign Application Priority Data

Jul. 2, 2013 (KR) .................. 10-2013-0077389
Jul. 18, 2013 (KR) .................. 10-2013-0084533
Jul. 1, 2014 (KR) .................. 10-2014-0081943

(51) Int. Cl.
*H04N 19/597* (2014.01)
*H04N 19/70* (2014.01)
(Continued)

(52) U.S. Cl.
CPC ......... *H04N 19/597* (2014.11); *H04N 19/139* (2014.11); *H04N 19/52* (2014.11);
(Continued)

(58) Field of Classification Search
None
See application file for complete search history.

(56) References Cited

U.S. PATENT DOCUMENTS

2012/0314027 A1 12/2012 Tian et al.
2014/0177711 A1* 6/2014 Kang ............... H04N 19/597
375/240.12

FOREIGN PATENT DOCUMENTS

KR 10-2008-0015713 A 2/2008
KR 20080015713 2/2008
(Continued)

OTHER PUBLICATIONS

Zou, et al. "Results on View Synthesis Prediction". Joint Collaborative Team on 3D Video Coding Extension Development of ITU-T SG 16 WP 3 and ISO/IEC JTC 1/SC 29/WG 11. (Oct. 10, 2010): 12 pages.
(Continued)

*Primary Examiner* — Christopher Braniff
(74) *Attorney, Agent, or Firm* — NSIP Law

(57) ABSTRACT

A method for decoding a video including a plurality of views, according to one embodiment of the present invention, comprises the steps of: configuring a base merge motion candidate list by using motion information of neighboring blocks and a time correspondence block of a current block; configuring an extended merge motion information list by using motion information of a depth information map
(Continued)

and a video view different from the current block; and determining whether neighboring block motion information contained in the base merge motion candidate list is derived through view synthesis prediction.

20 Claims, 24 Drawing Sheets

(51) Int. Cl.
| | | |
|---|---|---|
| | *H04N 19/52* | (2014.01) |
| | *H04N 19/139* | (2014.01) |
| | *H04N 19/176* | (2014.01) |
| | *H04N 19/105* | (2014.01) |
| | *H04N 19/463* | (2014.01) |
| | *H04N 19/187* | (2014.01) |

(52) U.S. Cl.
CPC .......... *H04N 19/70* (2014.11); *H04N 19/105* (2014.11); *H04N 19/176* (2014.11); *H04N 19/187* (2014.11); *H04N 19/463* (2014.11)

(56) References Cited

FOREIGN PATENT DOCUMENTS

| KR | 10-2013-0018628 A | 2/2013 |
|---|---|---|
| KR | 10-2013-0044189 A | 5/2013 |
| KR | 20130044189 | 5/2013 |
| WO | WO 2012/171442 A1 | 12/2012 |
| WO | WO 201306547 | 2/2013 |
| WO | WO 2013/068547 A2 | 5/2013 |

OTHER PUBLICATIONS

Lee, et al. "3D-CE1.h related: Simplification of VSP insertion process". Joint Collaborative Team on 3D Video Coding Extension Development of ITU-T SG 16 WP 3 and ISO/IEC JTC 1/SC 29/WG 11. (Apr. 13, 2013): 5 pages.

Tian, et al. "CE1.h: Backward View Synthesis Prediction using Neighbouring Blocks". Joint Collaborative Team on 3D Video Coding Extension Development of ITU-T SG 16 WP 3 and ISO/IEC JTC 1/SC 29/WG 11. (Jan. 10, 2013): 5 pages.

Bang, et al. "3D-CE3.h related: Simple merge candidate list construction for 3DV". Joint Collaborative Team on 3D Video Coding Extension Development of ITU-T SG 16 WP 3 and ISO/IEC JTC 1/SC 29/WG 11. (Jul. 20, 2013): 4 pages.

European Search Report dated Aug. 15, 2018 in counterpart European Application No. 14819793.2 (7 pages in English).

International Search Report dated Oct. 2, 2014 in counterpart International Application No. PCT/KR2014/005907 (12 pages, with English translation).

Extended European Search Report dated Feb. 1, 2017 in counterpart European Patent Application No. 14819793.2 (10 pages, in English).

Lee, Jin Young, et al. "3D-CE1. h: Backward View Synthesis Prediction Using Neighbouring Blocks." *Joint Collaborative Team on 3D Video Coding Extension Development, Doc. JCT3V-C0152, Geneva* (2013). (5 pages, in English).

Zou, Feng et al. "3D-CE1. h: Results on View Synthesis Prediction" *ITU-T SG16 WP3 & ISO/IEC JTC1/SC29/WG11 JCT3V-B0034* (2012). (12 pages, in English).

\* cited by examiner

FIG. 2
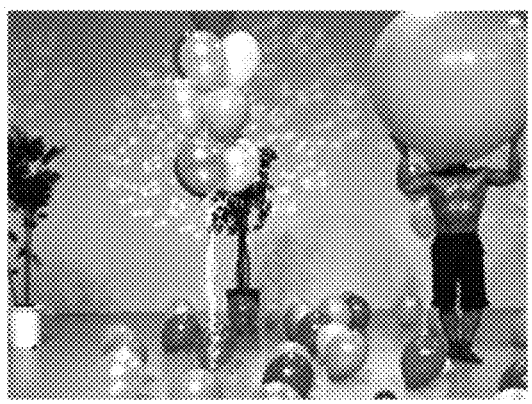 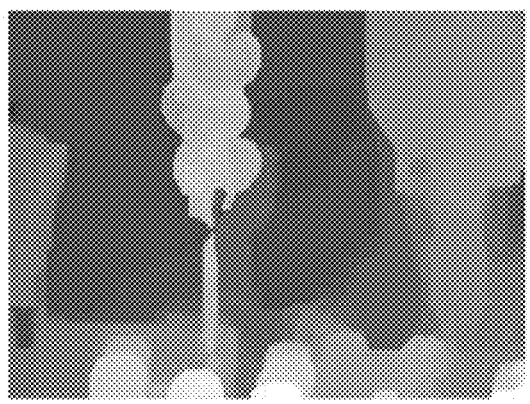
(a) real picture     (b) depth map

METHOD FOR ENCODING AND DECODING VIDEO INCLUDING PLURALITY OF LAYERS

CROSS-REFERENCE TO RELATED APPLICATIONS

This application is a Continuation of U.S. patent application Ser. No. 14/901,766 filed on Dec. 29, 2015, which is a National Stage of International Application No. PCT/KR2014/005907, filed Jul. 2, 2014, which claims the benefit under 35 USC § 119(e), 120 and 365(b) to Korean Patent Application No. 10-2014-0081943 filed on July 1, 2014, Korean Patent Application No. 10-2013-0084533 filed on Jul. 18, 2013 and Koran Patent Application No. 10-2013-0077389 filed on Jul. 2, 2013, the entire disclosures of which are incorporated herein by reference for all purposes.

TECHNICAL FIELD

The present invention relates to video encoding and decoding, and more particularly, to a method of encoding and decoding a video including a plurality of layers.

BACKGROUND ART

In recent years, as high definition (HD) broadcast services are spreading domestically and globally, a large number of users are getting used to high-resolution and high-quality videos and accordingly institutions put spurs to the development of next-generation video devices. Also, with growing interest in ultrahigh-definition (UHD) services having a resolution four times higher than HDTV, compression techniques for higher-quality videos are needed.

For video compression, there may be used an inter prediction technique of predicting pixel values included in a current picture from temporally previous and/or subsequent pictures of the current picture, an intra prediction technique of predicting pixel values included in a current picture using pixel information in the current picture, or an entropy encoding technique of assigning a short code to a symbol with a high appearance frequency and assigning a long code to a symbol with a low appearance frequency.

Video compression technology may include a technique of providing a constant network bandwidth in restricted operating environments of hardware without considering variable network environments. However, to compress video data used for network environments involving frequent changes of bandwidths, new compression techniques are required, wherein a scalable video encoding/decoding method may be employed.

Meanwhile, a three-dimensional (3D) video provides a 3D effect to users through a stereoscopic 3D display apparatus as if the users see and feel a real world. In this connection, the Moving Picture Experts Group (MPEG) as a working group of International Organization for Standardization (ISO)/International Electrotechnical Commission (IEC) to set standards for video technologies is conducting studies on 3D video standards. 3D video standards include standards for advanced data formats, which support representation of not only stereoscopic images but also autostereoscopic images using real images and a depth map thereof, and for relevant technologies.

FIG. 1 illustrates a basic structure of a 3D video system, which is currently considered in 3D video standards.

As shown in FIG. 1, a transmitter side generating content (3D content producer) acquires N-view (N≥2) picture contents using a stereo camera, a depth camera, a multi-camera setup and two-dimensional (2D)/3D conversion of converting a 2D picture into a 3D picture.

The acquired picture contents may include N-view video information (N×Video) and depth map information thereof and camera related side information.

The N-view picture contents are compressed using a multi-view video encoding method, and a compressed bit stream is transmitted to a terminal through a network, for example, digital video broadcasting (DVB).

A receiver side decodes the transmitted bit stream using a multi-view video decoding method, for example, depth-image-based rendering (DIBR), to reconstruct N-view pictures.

The reconstructed N-view pictures generate virtual-view pictures from N views or greater by DIBR.

The virtual-view pictures from the N views or greater are reproduced suitably for various stereoscopic display apparatuses, for instance, 2D display, M-view 3D display and head-tracked stereo display, to provide stereoscopic pictures to users.

A depth map used to generate a virtual-view picture represents a distance between a camera and an object (a depth corresponding to each pixel in the same resolution as that of a real picture) in the real world expressed as a certain bit number.

FIG. 2 illustrates a depth map of picture "balloons" being used in MPEG standards for 3D video coding.

In FIG. 2, (a) is a real picture of picture "balloons," (b) is a depth map of picture "balloons." In (b), a depth is expressed as 8 bits per pixel.

H.264/AVC (MPEG-4 Part 10 Advanced Video Coding) may be used as an example for coding the real picture and the depth map thereof. Alternatively, High Efficiency Video Coding (HEVC), as an international video compression standard jointly developed by the MPEG and Video Coding Experts Group (VCEG), may be employed.

FIG. 3 illustrates an inter-view prediction structure in a 3D video codec.

A real picture and a depth map thereof may be images obtained not only by a single camera but also a plurality of cameras. Pictures obtained by a plurality cameras may be encoded independently, in which a general 2D video coding codec may be used.

Further, the pictures obtained by the plurality of cameras have correlations in view and accordingly may be encoded using different inter-view predictions so as to enhance encoding efficiency.

As shown in FIG. 3, viewpoint 1 (view 1) is a picture captured by a left camera based on viewpoint 0 (view 0), while viewpoint 2 (view 2) is a picture captured by a right camera based on View 0.

View 1 and view 2 may be inter-view predicted using view 0 as a reference picture, in which case view 0 needs encoding prior to view 1 and view 2. Here, view 0 may be encoded independently of other views and thus be referred to as an independent view.

On the contrary, view 1 and view 2 use view 0 as a reference picture and thus may be referred to as dependent views. An independent view picture may be encoded using a general 2D video codec, whereas a dependent view picture needs to be inter-view predicted and thus may be encoded using a 3D video codec including an inter-view prediction process.

Further, view 1 and view 2 may be encoded using a depth map so as to increase encoding efficiency.

FIG. 4 is a block diagram schematically illustrating a video encoder and a video decoder which encode and decode a texture and a depth.

As shown in FIG. 4, the video encoder 410 includes a texture encoder 415 and a depth encoder 417, and the video decoder 420 includes a texture decoder 425 and a depth decoder 427.

The texture encoder 415 receives an input of a texture corresponding to a real picture and encodes the texture into a bit stream, and the texture decoder 425 receives the bit stream encoded by the texture encoder 415 and decodes the bit stream to output the decoded texture.

The texture encoder 417 encodes a depth, that is, a depth map, and the texture decoder 427 decodes the depth map.

When a real picture and a depth map thereof are encoded, the real picture and the depth map thereof may be encoded/decoded separately.

Further, when the picture and the depth map are encoded as in FIG. 4, the picture and the depth map may be encoded/decoded by referring to each other, that is, dependently. A real picture may be encoded/decoded using an already encoded/decoded depth map, and a depth map may be encoded/decoded likewise using an already encoded/decoded real picture.

FIG. 5 illustrates a prediction structure of 3D picture coding. Specifically, FIG. 5 illustrates an encoding prediction structure for encoding real pictures captured by three cameras and depth maps thereof.

In FIG. 5, three real pictures are represented by T0, T1 and T2 depending on viewpoints, and three depth maps at the same positions as those of the real pictures are represented by D0, D1 and D2.

Here, T0 and D0 are pictures obtained from view 0, T1 and D1 are pictures obtained from view 1, and T2 and D2 are pictures obtained from view 2. The respective pictures may be encoded into an intra picture (I), a uni-prediction picture (P) and a bi-prediction picture (B).

Prediction methods for deriving motion information on a current block from a real picture may be largely divided into temporal prediction and inter-view prediction. Temporal prediction is a prediction method using a temporal correlation at the same view, while inter-view prediction is a prediction method using an inter-view correlation. Temporal prediction and inter-view prediction may be used in a combination for predicting a single picture. The motion information may include at least one of a motion vector, a reference picture number, prediction direction information indicating whether unidirectional prediction or bidirectional prediction is used, and information indicating whether inter-view prediction, temporal prediction, or another prediction is used.

In FIG. 5, an arrow represents a prediction direction, and the real pictures and the depth maps thereof may be encoded/decoded dependently on each other. That is, the depth maps may be referenced for predicting the real pictures, and the real pictures may be referenced for predicting the depth maps.

However, to decode a 3D picture, implementation complexity of hardware and software increase and computational complexity also increase.

DISCLOSURE

Technical Problem

An aspect of the present invention is to provide a method for reducing implementation complexity and computational complexity in a video codec.

Another aspect of the present invention is to provide a method for increasing reusability of an encoding/decoding module.

Still another aspect of the present invention applies a module used for encoding a texture view from an independent view, which provides backward compatibility, to texture views and depth views from dependent views as it is to thereby reduce implementation complexity, while additionally applying a local encoder to the texture views and depth views from the dependent views to thereby improve encoding efficiency.

Technical Solution

The present invention provides a method and apparatus for encoding/decoding texture views and depth views from dependent views (view 1 and view 2) by reusing an encoding/decoding module for a texture view from an independent view (view 0).

The present invention provides a method and apparatus for encoding/decoding texture views and depth views from dependent views using the same encoding/decoding module used for encoding a texture view from an independent view and then re-encoding/re-decoding or resetting (or changing) the texture views and depth views from the dependent views (view 1 and view 2) using an additional encoding/decoding module.

The present invention provides a method and apparatus for constructing a basic merge motion candidate list for texture views and depth views from dependent views (view 1 and view 2) using the same basic merge motion list constructing module used for encoding a texture view from an independent view and then resetting (changing) the basic merge motion candidate list by additionally using an additional merge motion list constructing module to construct an extended merge motion candidate list.

The present invention provides a method and apparatus for determining whether to perform an additional encoding/decoding module and an additional merge motion list constructing module through information (texture/depth information) whether a picture is a texture view or a depth view and view information (ViewID).

The present invention provides a method and apparatus for adding additional motion information as a first entry (or an entry at a random position) to a basic merge motion candidate list in constructing an extended merge motion candidate list using the basic merge motion candidate list.

The present invention provides a method and apparatus for comparing additional motion information with motion information of a first entry to determine whether to add the additional motion information before adding the additional motion information as the first entry (or an entry at a random position) to a basic merge motion candidate list.

The present invention provides a method and apparatus for adding pieces of additional motion information to random positions of a basic merge motion candidate list and resetting and rearranging the pieces of additional motion information.

Advantageous Effects

According to an embodiment of the present invention, there are provided a method for reducing implementation complexity and computational complexity in a video codec.

Also, there are provided a method for increasing reusability of an encoding/decoding module.

In addition, a module used for encoding a texture view from an independent view, which provides backward compatibility, is applied to texture views and depth views from dependent views as it is to thereby reduce implementation complexity, while additionally applying a local encoder to the texture views and depth views from the dependent views to thereby improve encoding efficiency.

DESCRIPTION OF DRAWINGS

FIG. 2 illustrates a depth map of picture "balloons."

MODE FOR INVENTION

Hereinafter, embodiments of the present invention are described in detail with reference to the accompanying drawings. In describing the embodiments of the present invention, a detailed description of related known elements or functions will be omitted if it is deemed to make the gist of the present invention unnecessarily vague.

It will be understood that when an element is referred to as being "connected" or "coupled" to another element, the element can be directly connected or coupled to another element or intervening elements. Also, when it is said that a specific element is "included," it may mean that elements other than the specific element are not excluded and that additional elements may be included in the embodiments of the present invention or the scope of the technical spirit of the present invention.

Although the terms "first," "second," etc. may be used to describe various elements, these elements should not be limited by these terms. These terms are used only to distinguish one element from another element. For example, a first element may be named a second element without departing from the scope of the present invention. Likewise, a second element may be named a first element.

Although components described in the embodiments of the present invention are independently illustrated in order to show different characteristic functions, such a configuration does not indicate that each component is constructed by a separate hardware constituent unit or software constituent unit. That is, each component includes individual components that are arranged for convenience of description, in which at least two components may be combined into a single component or a single component may be divided into a plurality of components to perform functions. It is to be noted that embodiments in which some components are integrated into one combined component and/or a component is divided into multiple separate components are included in the scope of the present invention without departing from the essence of the present invention.

Some constituent elements are not essential to perform the substantial functions in the invention and may be optional constituent elements for merely improving performance. The present invention may be embodied by including only constituent elements essential to implement the spirit of the invention other than constituent elements used for merely improving performance. A structure including only the essential constituent elements other than optional constituents used for merely improving performance also belongs to the scope of the present invention.

Figure 1:
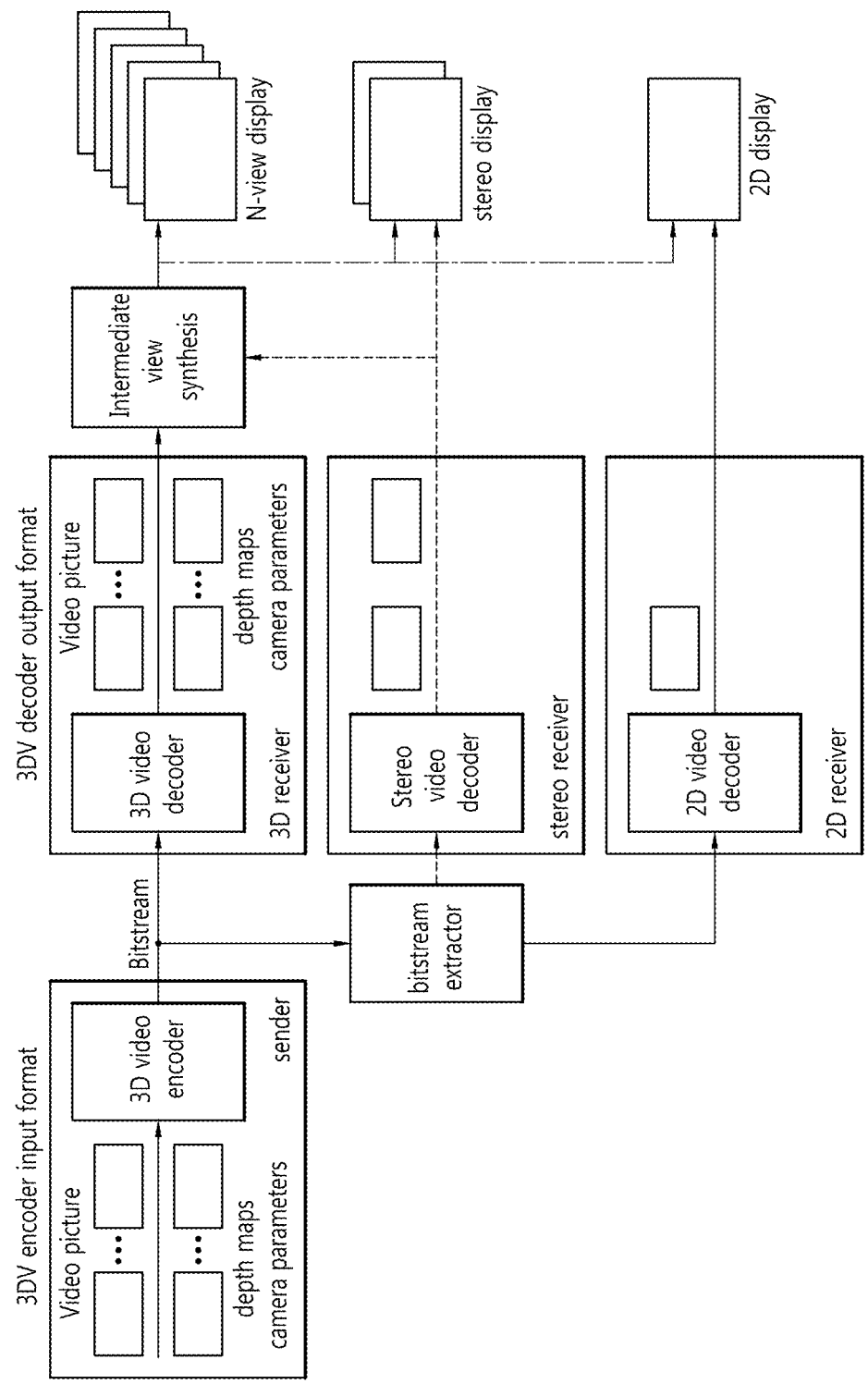
FIG. 1 illustrates a basic structure of a three-dimensional (3D) video system.
Figure 3:
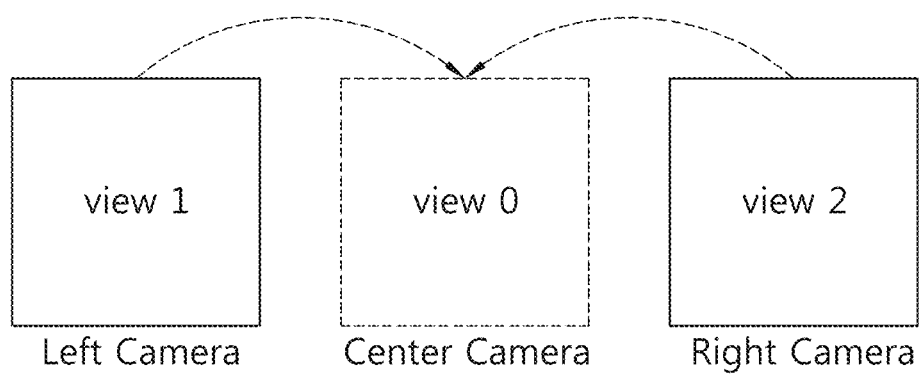
FIG. 3 illustrates an inter-view prediction structure in a 3D video codec.
Figure 4:
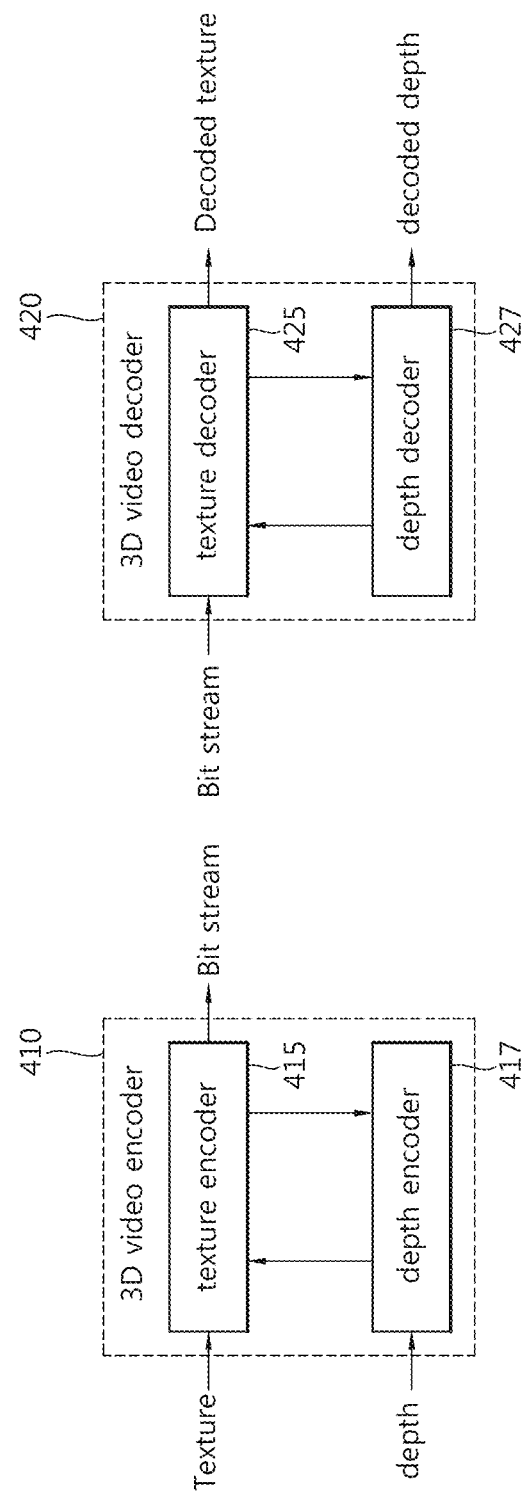
FIG. 4 is a block diagram schematically illustrating a video encoder and a video decoder which encode and decode a 3D texture and depth.
Figure 5:
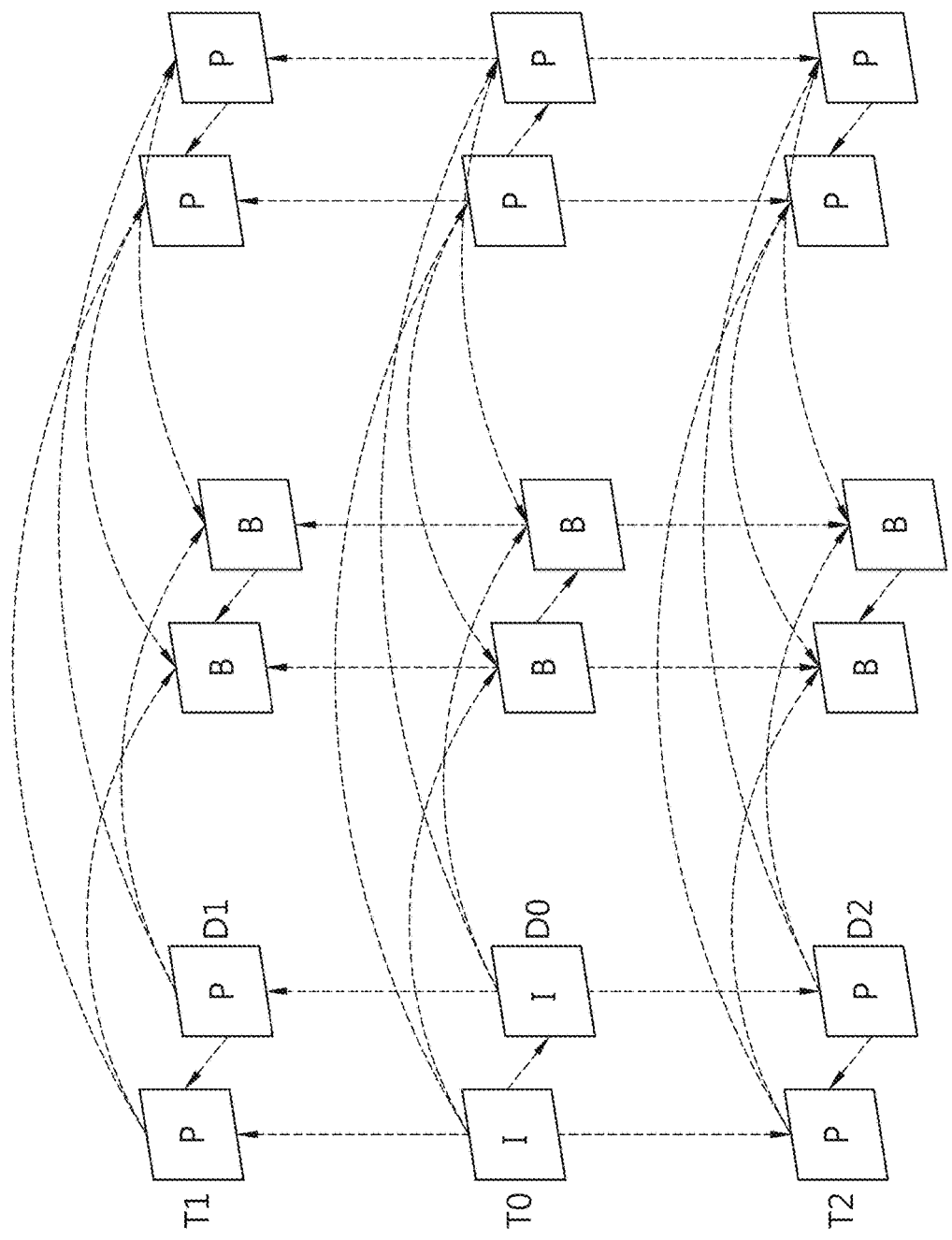
FIG. 5 illustrates a prediction structure of 3D picture coding.
Figure 6:
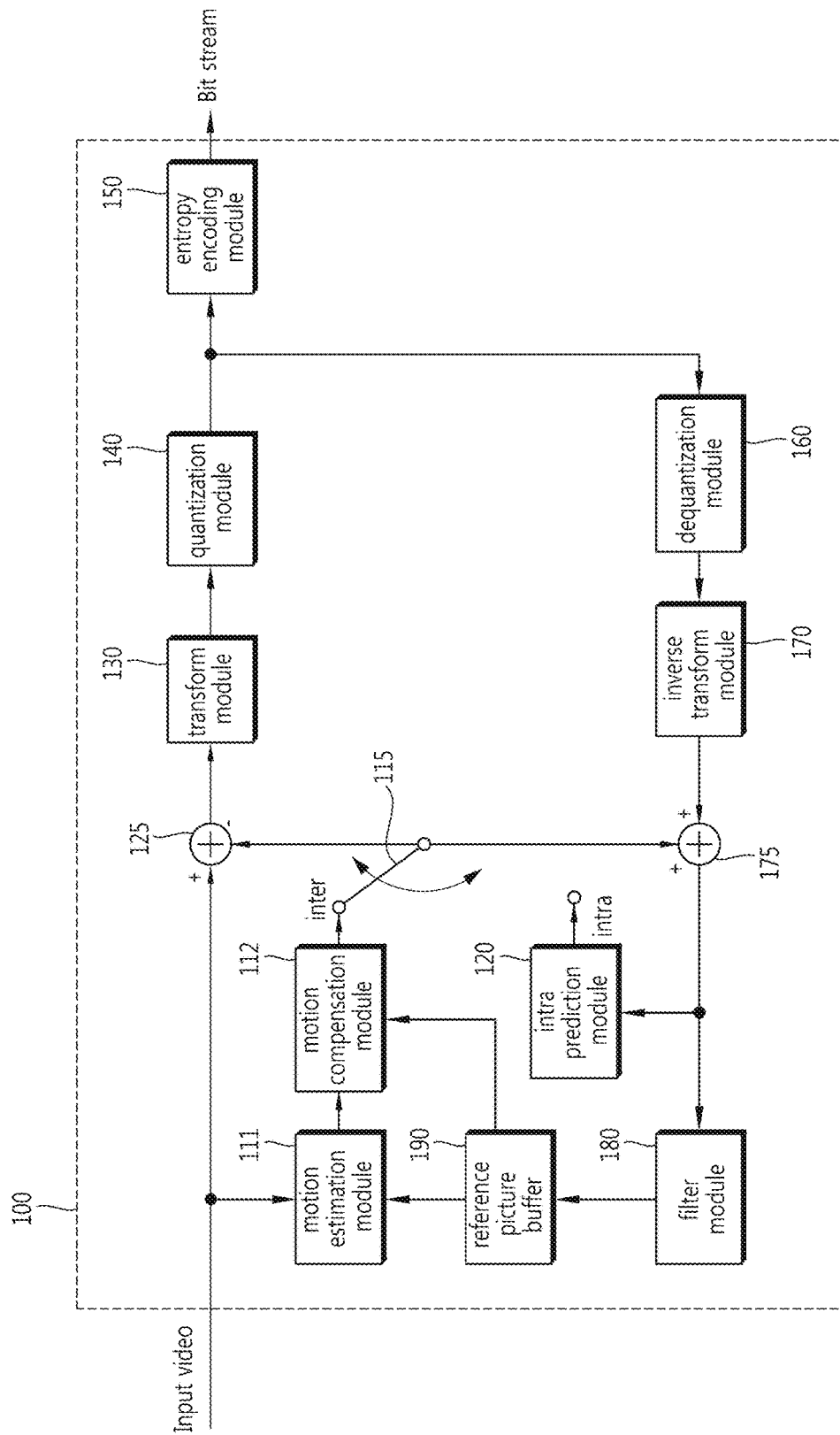
FIG. 6 is a block diagram illustrating a configuration of a video encoding apparatus according to an exemplary embodiment.

FIG. 6 is a block diagram illustrating a configuration of a video encoding apparatus according to an exemplary embodiment. A multi-view video encoding/decoding method or apparatus may be realized by extension of a general video encoding/decoding method or apparatus that does not provide multi-view, and the block diagram of FIG. 6 illustrates an example of a video encoding apparatus which may form a basis of a multi-view video encoding apparatus.

Referring to FIG. 6, the video encoding apparatus 100 includes a motion estimation module 111, a motion compensation module 112, an intra prediction module 120, a switch 115, a subtractor 125, a transform module 130, a quantization module 140, an entropy encoding module 150, an dequantization module 160, an inverse transform module 170, an adder 175, a deblocking filter module 180, and a reference picture buffer 190.

The video encoding apparatus 100 may encode an input picture images in an intra mode or an inter mode and output a bit stream. Intra prediction means an intra-picture prediction, and inter prediction means an inter-picture prediction. In the intra mode, the switch 115 is shifted to 'intra,' and in the inter mode, the switch 115 is shifted to 'inter.' The video encoding apparatus 100 may generate a prediction block for an input block of the input picture and then encode a difference between the input block and the prediction block.

Here, an option whether to encode or not to encode a block corresponding to the difference may be determined for high encoding efficiency in view of rate-distortion optimization. The prediction block may be generated through intra prediction or inter prediction. Here, an option whether to perform intra prediction or inter prediction may be determined for high encoding efficiency in view of rate-distortion optimization.

In the intra mode, the intra prediction module 120 may perform spatial prediction by using a pixel value of a pre-encoded block around a current block to generate a prediction block.

In the inter mode, the motion estimation module 111 may obtain a region which is most matched with the input block in the reference picture stored in the reference picture buffer 190 during a motion estimation process to derive a motion vector. The motion compensation module 112 may perform motion compensation using the motion vector and the reference picture stored in the reference picture buffer 190, thereby generating the prediction block.

The subtractor 125 may generate a residual block based on the difference between the input block and the generated prediction block. The transform module 130 may transform the residual block to output a transform coefficient. The quantization module 140 may quantize the transform coefficient according to a quantization parameter to output a quantized coefficient.

The entropy encoding module 150 may entropy-encode a symbol according to probability distribution based on values derived by the quantization module 140 or an encoding parameter value derived in encoding, thereby outputting a bit stream. Entropy encoding is a method of receiving symbols having different values and representing the symbols as a decodable binary sequence or string while removing statistical redundancy.

Here, a symbol means a syntax element as an encoding/decoding target, a coding parameter, a value of a residual signal, or the like. A coding parameter, which is a parameter necessary for encoding and decoding, may include information encoded by the encoding apparatus and transferred to the decoding apparatus, such as a syntax element, and information to be inferred during an encoding or decoding process and means information necessary for encoding and decoding a picture. The coding parameter may include, for example, values or statistics of an intra/inter prediction mode, a movement/motion vector, a reference picture index, a coding block pattern, presence and absence of a residual signal, a transform coefficient, a quantized transform coefficient, a block size and block partition information. A residual signal may denote a difference between an original signal and a prediction signal, a transformed signal of the difference between the original signal and the prediction signal, or a transformed and quantized signal of the difference between the original signal and the prediction signal. The residual signal may be referred to as a residual block in a block unit.

When entropy encoding is applied, a symbol having a high probability is allocated a small number of bits and a symbol having a low probability is allocated a large number of bits in representation of symbols, thereby reducing a size of bit strings for symbols to be encoded. Accordingly, entropy encoding may enhance compression performance of video encoding.

For entropy encoding, encoding methods, such as exponential Golomb, context-adaptive variable length coding (CAVLC) and context-adaptive binary arithmetic coding (CABAC), may be used. For example, a table used for performing entropy encoding, such as a variable length coding/code (VLC) table, may be stored in the entropy encoding module 150, and the entropy encoding module 150 may perform entropy encoding using the stored VLC table. In addition, the entropy encoding module 150 may derive a binarization method of a target symbol and a probability model of a target symbol/bin and perform entropy encoding using the derived binarization method or probability model.

The quantized coefficient may be dequantized by the dequantization module 160 and inversely transformed by the inverse transform module 170. The dequantized and inversely transformed coefficient is added to the prediction block by the adder 175, thereby generating a reconstructed block.

The reconstructed block is subjected to the deblocking filter module 180, and the deblocking filter module 180 may apply at least one of a deblocking filter, a sample adaptive offset (SAO), and an adaptive loop filter (ALF) to the reconstructed block or a reconstructed picture. The reconstructed block obtained via the deblocking filter module 180 may be stored in the reference picture buffer 190.

Figure 7:
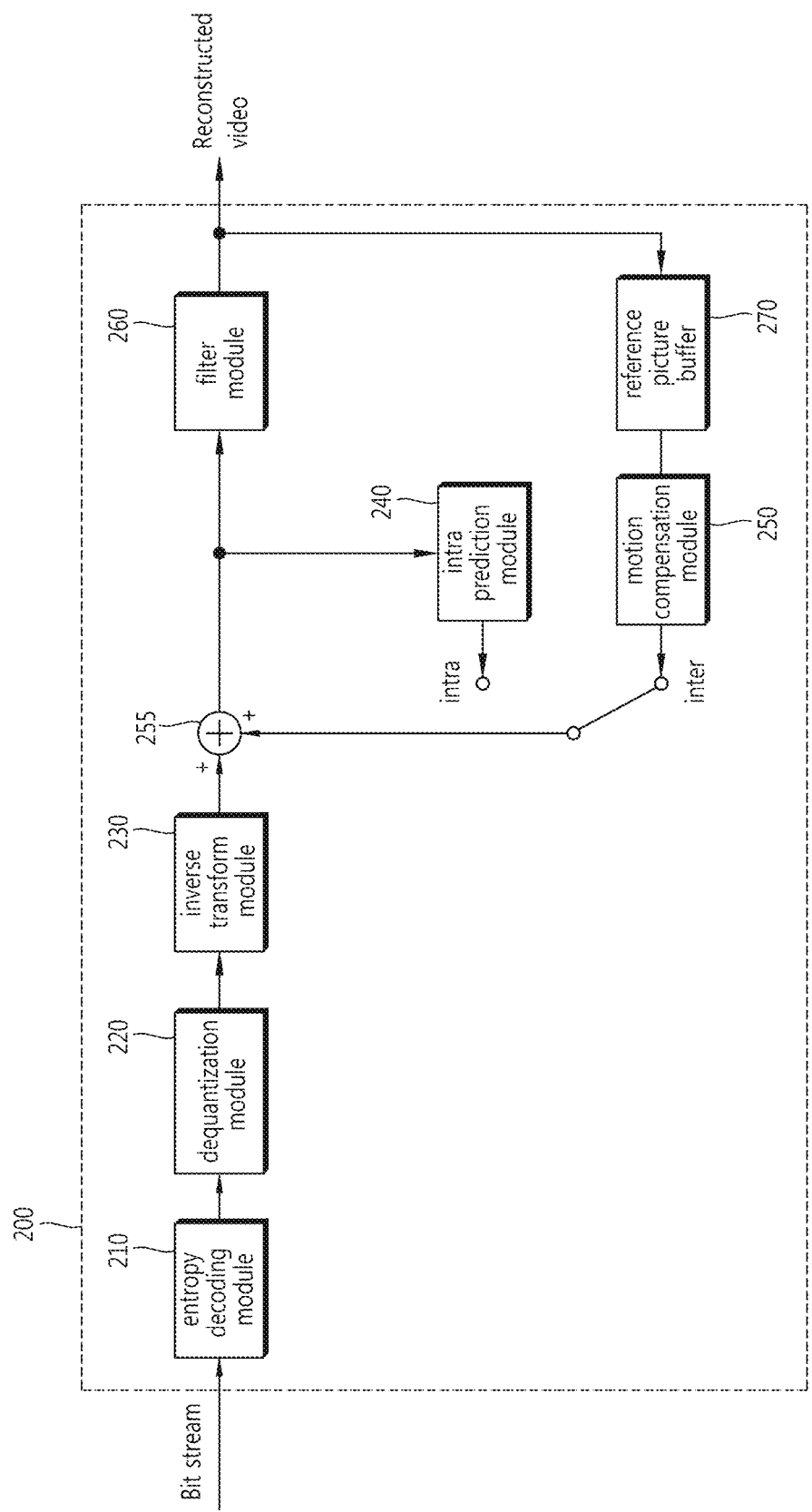
FIG. 7 is a block diagram illustrating a configuration of a video decoding apparatus according to an exemplary embodiment.

FIG. 7 is a block diagram illustrating a configuration of a video decoding apparatus according to an exemplary embodiment. As described above in FIG. 6, a multi-view video encoding/decoding method or apparatus may be realized by extension of a general video encoding/decoding method or apparatus that does not provide multi-view, and the block diagram of FIG. 7 illustrates an example of a video decoding apparatus which may form a basis of a multi-view video decoding apparatus.

Referring to FIG. 7, the video decoding apparatus 200 includes an entropy-decoding module 210, a dequantization module 220, an inverse transform module 230, an intra prediction module 240, a motion compensation module 250, a deblocking filter module 260, and a reference picture buffer 270.

The video decoding apparatus 200 receives an input bit stream output from the encoding apparatus and decodes the bit stream in an intra mode or inter mode to output a reconstituted picture, that is, a reconstructed picture. In the intra mode, a switch may be shifted to 'intra,' and in the inter mode, the switch may be shifted to 'inter. The video decoding apparatus 200 may obtain a residual block reconstructed from the input bit stream, generate a prediction block, and add the residual block and the prediction block to generate a reconstituted block, that is, a reconstructed block.

The entropy decoding module 210 may entropy-decode the input bit stream according to probability distribution to generate symbols including a symbol in a form of a quantized coefficient. Entropy decoding is a method of receiving a binary sequence to generate symbols. The entropy decoding method is similar to the aforementioned entropy encoding method.

The quantized coefficient is dequantized by the dequantization module 220 and inversely transformed by the inverse transform module 230, thereby generating a reconstructed residual block.

In the intra mode, the intra prediction module 240 may perform spatial prediction by using a pixel value of a pre-encoded block around a current block to generate a prediction block. In the inter mode, the motion compensation module 250 may perform motion compensation using a motion vector and a reference picture stored in the reference picture buffer 270, thereby generating a prediction block.

The reconstructed residual block and the prediction block are added by an adder 255, and the added blocks are subjected to the deblocking filter module 260. The deblocking filter module 260 may apply at least one of a deblocking filter, an SAO, and an ALF to the reconstructed block or the reconstructed picture. The deblocking filter module 260 outputs the reconstituted picture, that is, the reconstructed picture. The reconstructed picture may be stored in the reference picture buffer 270 to be used for inter prediction.

As described above, a high-capacity 3D video content needs to be efficiently compressed so as to reduce an amount of bit stream. To increase encoding efficiency, correlation between different views may be used or correlation between a texture view and a depth view may be used.

Figure 8:
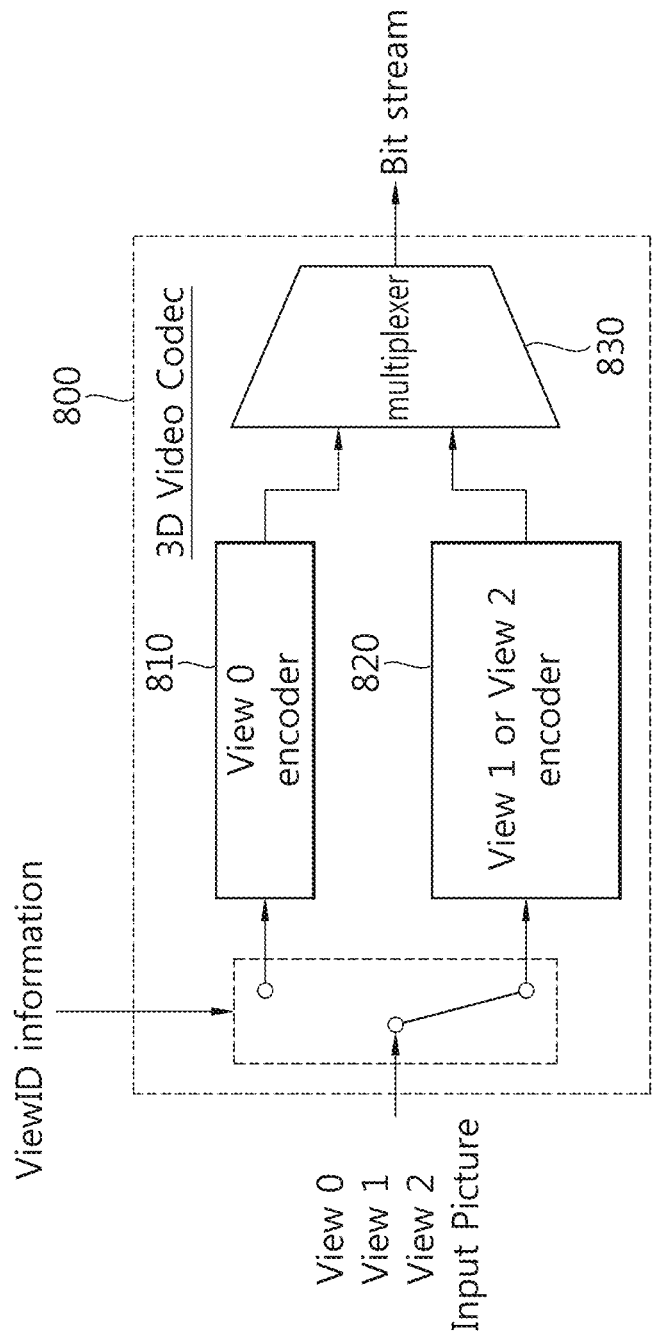
FIG. 8 is a block diagram illustrating a structure of an encoder of a 3D video codec.

FIG. 8 is a block diagram illustrating a structure of an encoder of a 3D video codec.

As shown in FIG. 8, a video encoder 800 includes a plurality of view encoders 810 and 820 and a multiplexer 830.

The 3D video encoder of FIG. 8 receives pictures from three different views, encodes the pictures using the view encoders 810 and 820, and outputs one integrated bit stream through the multiplexer 830. Here, the pictures may include not only a general picture (texture view) but also a depth map (depth view).

The 3D video encoder of FIG. 8 encodes the pictures using the different encoders 810 and 820 depending on view information (view ID information). That is, a picture from view 0 needs to be encoded in an existing 2D video codec for backward compatibility and thus is encoded in a base-layer encoder (view 0 encoder) 810. Pictures from view 1 and view 2 need encoding with a 3D video codec including an inter-view prediction algorithm and an algorithm using correlation between the texture view and the depth view and thus are encoded by an enhancement-layer encoder (view 1 or view 2 encoder) 820.

Further, the depth view, other than the texture view, may be encoded by utilizing encoded information on the texture view and thus is encoded in the enhancement-layer encoder 820.

Thus, a more complicated encoder is required when encoding the pictures from view 1 and view 2 than when encoding the picture from view 0. A more complicated encoder is also required when encoding the depth view than when encoding the base-layer texture view. In addition, implementation complexity in hardware and software for realizing such encoders and computational complexity increase.

Meanwhile, in HEVC, a merge motion method is used to encode motion information in video encoding/decoding.

Figure 9:
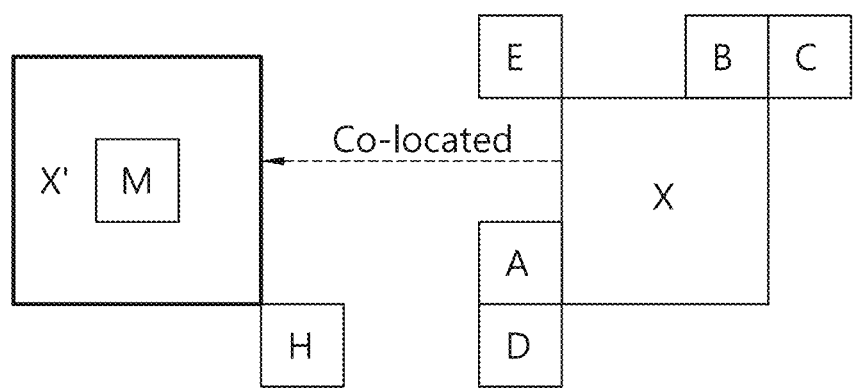
FIG. 9 illustrates neighboring blocks used to construct a merge motion candidate list.

FIG. 9 illustrates neighboring blocks used to construct a merge motion candidate list.

The merge motion candidate list is generated based on neighboring blocks A, B, C, D and E to a current block X and a collocated (col) block H or M specified based on a block X' present at a corresponding position of a reference picture. A decoder and an encoder may determine whether motion information on the neighboring blocks and the col block is available for a merge motion of the current block, and if available, construct the merge motion candidate list using motion information on a corresponding block.

Figure 10:
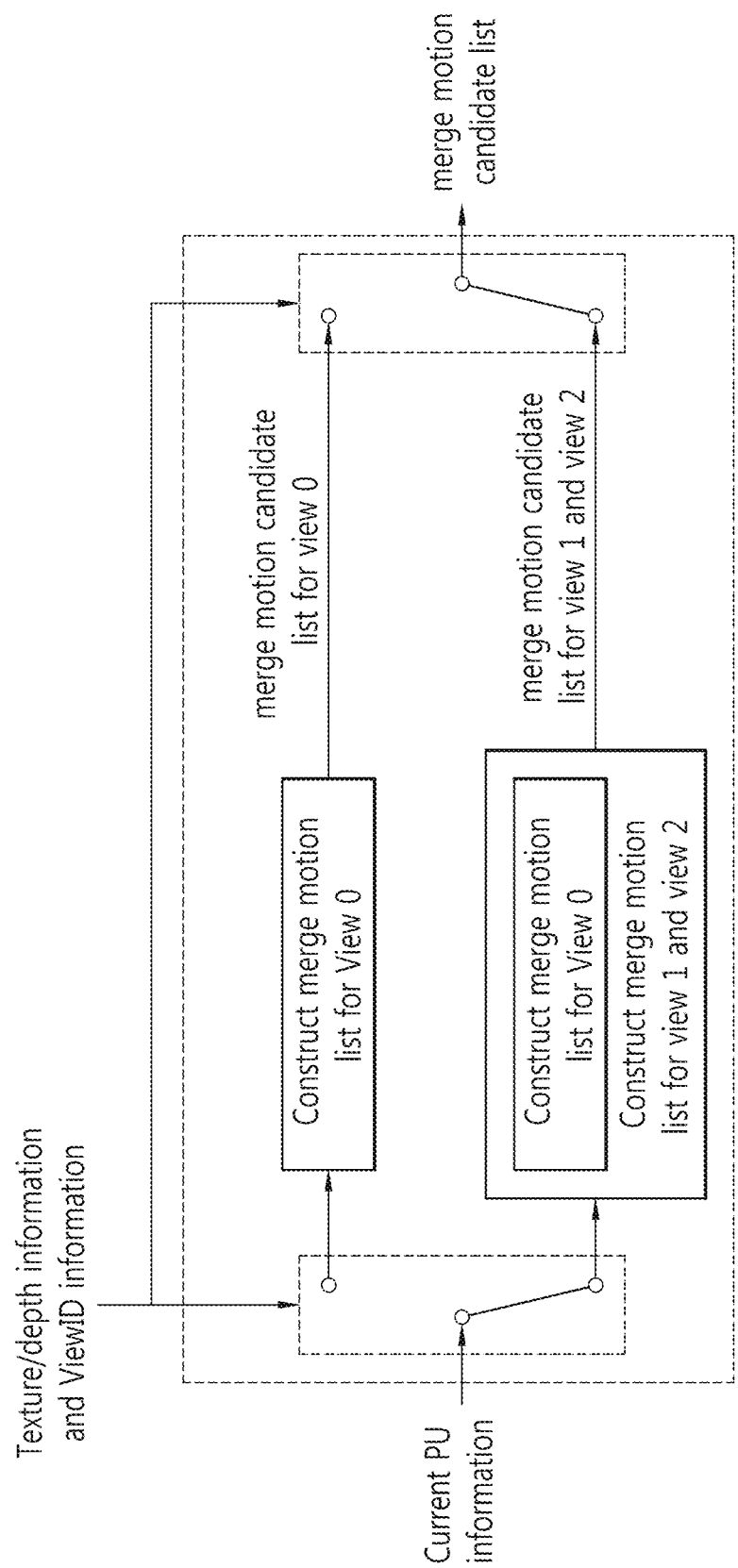
FIG. 10 is a schematic view illustrating a method of generating a merge motion candidate list.

FIG. 10 is a schematic view illustrating a method of generating a merge motion candidate list.

As shown in FIG. 10, 3D video coding is divided into a merge motion constructing method for view 0 and a merge motion constructing method for other views, for example, view 1 and view 2.

When a current prediction unit (PU, prediction block (PB) or a block with a random size) picture is input, one of the merge motion constructing method for view 0 and the merge motion constructing method for other views (view 1 and view 2) is selected and conducted based on information (texture/depth information) specifying whether the picture is a texture view or a depth view and view information (ViewID). Subsequently, a merge motion candidate list for the current PU picture is finally output.

Here, a merge motion candidate list for the texture view from view 0, that is, a base layer, is constructed using a merge motion constructing method for a base layer (also, "base-layer merge motion constructing method") in view of reverse compatibility. Meanwhile, merge motion candidate lists for the texture view and the depth view from view 1 and view 2 are constructed using a merge motion constructing method for an enhancement layer (also, "enhancement-layer merge motion constructing method").

As shown in FIG. 10, the merge motion constructing method for the enhancement layer (other views (view 1 and view 2) than the base layer) may be carried out by adding a new candidate to the merge motion constructing method for the base layer or modifying a candidate list order. In order to increase encoding efficiency in the enhancement layer, the enhancement layer employs an enhanced merge motion constructing method by modifying the merge motion constructing method for the base layer. That is, the enhancement-layer merge motion constructing method includes the base-layer merge motion constructing method.

The enhancement-layer merge motion constructing method is constructed more complicated than the base-layer merge motion constructing method and also has higher computational complexity. Furthermore, in view of implementation by hardware or software, both the base-layer merge motion constructing method and the enhancement-layer merge motion constructing method need realizing, and thus implementation complexity may increase twice or greater.

Figure 11:
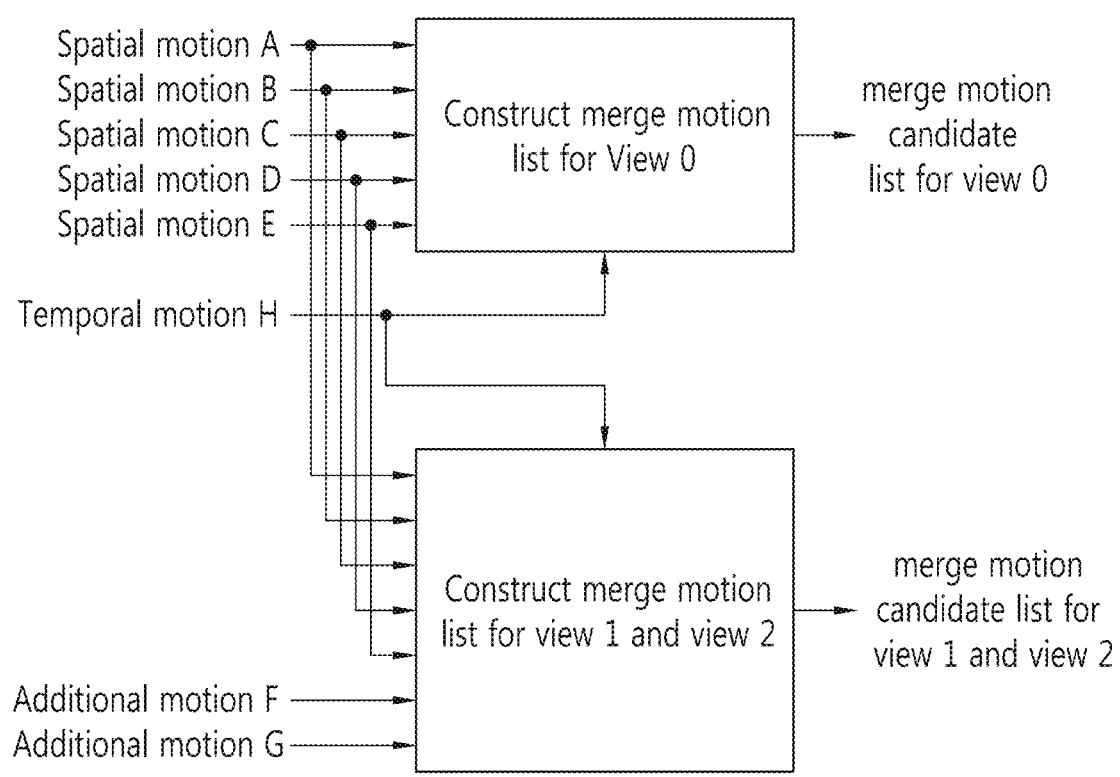
FIG. 11 illustrates an example of hardware implementation for generating a merge motion candidate list.

FIG. 11 illustrates an example of hardware implementation for generating a merge motion candidate list.

As shown in FIG. 11, input parameters in constructing a merge motion list for a texture view from view 0 include spatial motion A corresponding to spatial motion information on block A, spatial motion B corresponding to spatial motion information on block B, spatial motion C corresponding to spatial motion information on block C, spatial motion D corresponding to spatial motion information on block D, spatial motion E corresponding to spatial motion information on block E, and spatial motion H corresponding to spatial motion information on block H.

Parameters input in constructing a merge motion list for view 1 and view 2 includes additional motion F and additional motion G for a texture view and a depth view from view 1 and view 2 in addition to the parameters input in constructing the merge motion list for view 0.

As described above, since input parameters for generating a motion candidate list are added, a new merge motion list constructing module is needed for the general picture and the depth map from view 1 and view 2, which may cause an increase in complexity in hardware implementation.

Thus, the present invention suggests a method for reducing implementation complexity and computational complexity of an encoding algorithm and video codec for the enhancement layer (for example, texture view and depth view from view 1 and view 2).

The present invention is aimed to apply a merge motion candidate list construction module for the base layer (texture view from view 0), realized as a hardware chip, to the enhancement layer (for example, texture view and depth view from view 1 and view 2) as it is, thereby reducing hardware implementation complexity.

That is, a user having an encoder/decoder (for example, merge motion candidate list construction module) for the base layer used for a 2D video service may attach an additional module (for example, merge motion candidate list construction module for the enhancement layer) to the existing encoder/decoder, thereby being easily provided with a 3D video service.

Hereinafter, a video encoding method and a video decoding method according to the present invention will be described in detail.

Figure 12:
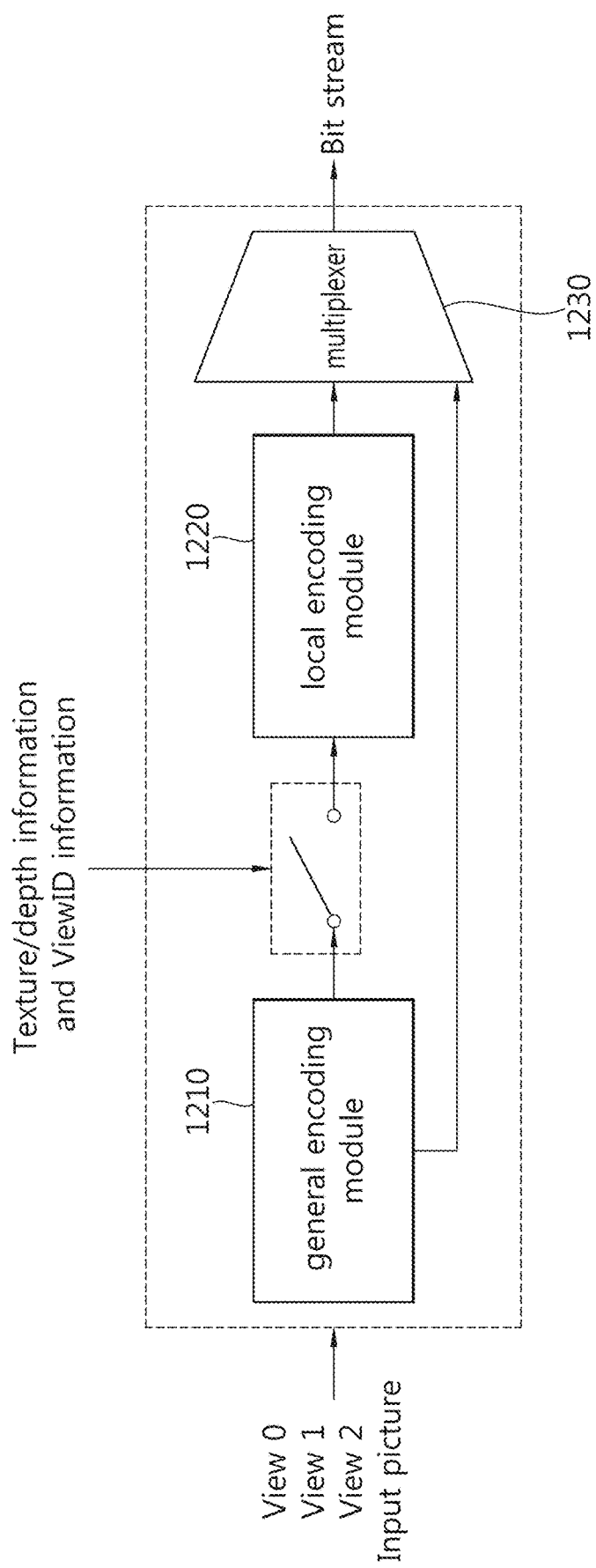
FIG. 12 is a schematic diagram illustrating a video encoder according to an embodiment of the present invention.

FIG. 12 is a schematic diagram illustrating a video encoder according to an embodiment of the present invention.

As shown in FIG. 12, the video encoder, which includes a general encoding module 1210 and a local encoding module 1220, receives inputs of pictures from three different views (view 0, view 1 and view 2), encodes the pictures and outputs a single integrated bit stream. Here, the pictures may include a texture view and a depth view.

Unlike in FIG. 8, the pictures are encoded by a single encoder, instead of separate encoders for the respective pictures. The video encoder of FIG. 12 may be configured as hardware supporting MPEG-1, MPEG-2, MPEG-4 Part 2 Visual, H.264/AVC, VC-1, AVS, KTA, and HEVC (H.265/HEVC).

The general encoding module 1210 is a module for encoding the texture view from an independent view (view 0) providing backward compatibility.

The local encoding module 1220 is a module for performing additional encoding for enhancing encoding efficiency, which encodes texture views and depth views from other views (view 1 and view 2) than view 0.

Subsequently, a bit stream of the texture view from view 0 and bit streams of the texture views and depth views from other views (view 1 and view 2) are multiplexed into a single bit stream by a multiplexer 1230.

That is, the encoder according to the present embodiment may apply the module used for encoding the texture view from the independent view, which provides backward compatibility, to the texture views and the depth views from the dependent views as it is to thereby reduce implementation complexity, while additionally applying the local encoding module to the texture views and the depth maps from the dependent views to thereby improve encoding efficiency.

The encoder of FIG. 12 may be applied to the entire encoding and decoding apparatuses or to each specific module.

Figure 13:
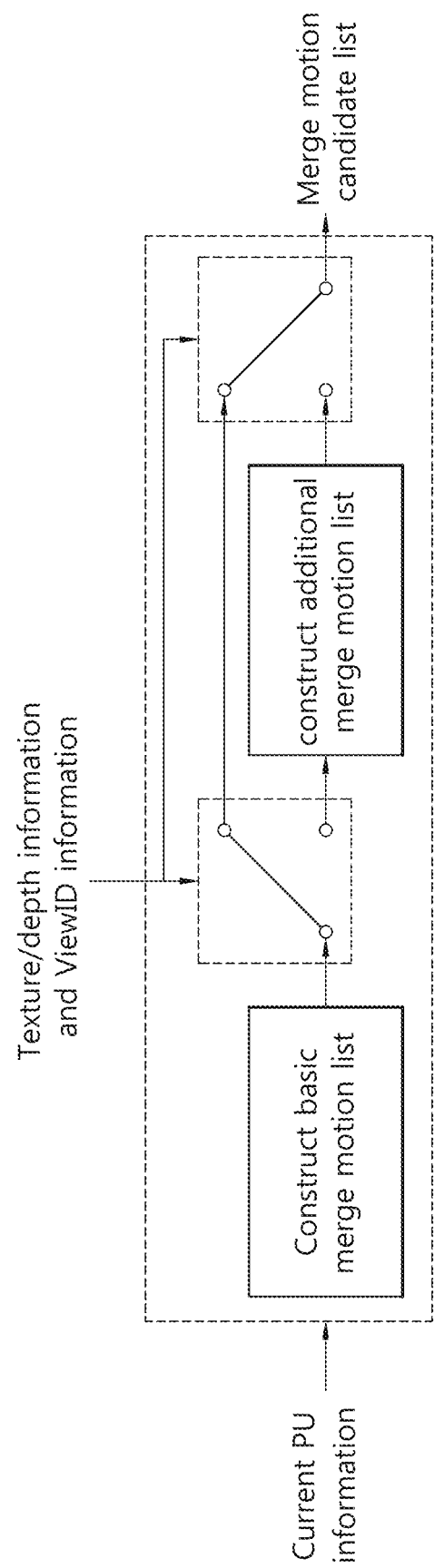
FIG. 13 is a schematic diagram illustrating a method of generating a merge motion candidate list according to an embodiment of the present invention.

FIG. 13 is a schematic diagram illustrating a method of generating a merge motion candidate list according to an embodiment of the present invention.

When the merge motion candidate list is constructed, current PU information (or picture), information (texture/depth information) specifying whether the input picture is a texture view or depth view, and view information (ViewID information) are input, while a merge motion candidate list for the current PU is output.

As shown in FIG. 13, constructing a basic merge motion list for the current PU is carried out first, and accordingly the basic merge motion candidate list is output. For example, constructing the basic merge motion list may be carried out using a known merge motion candidate list constructing method, such as HEVC.

Next, constructing an additional merge motion list is additionally carried out depending on the information (texture/depth information) specifying whether the current PU picture is a texture view or depth view and the view information (ViewID information).

Here, in constructing the additional merge motion list, the basic merge motion candidate list, which is output in constructing the basic merge motion list, is input, while and an extended merge motion candidate list is output. Constructing the additional merge motion list may be carried out with respect to texture views and depth maps from view 1 and view 2.

Figure 14:
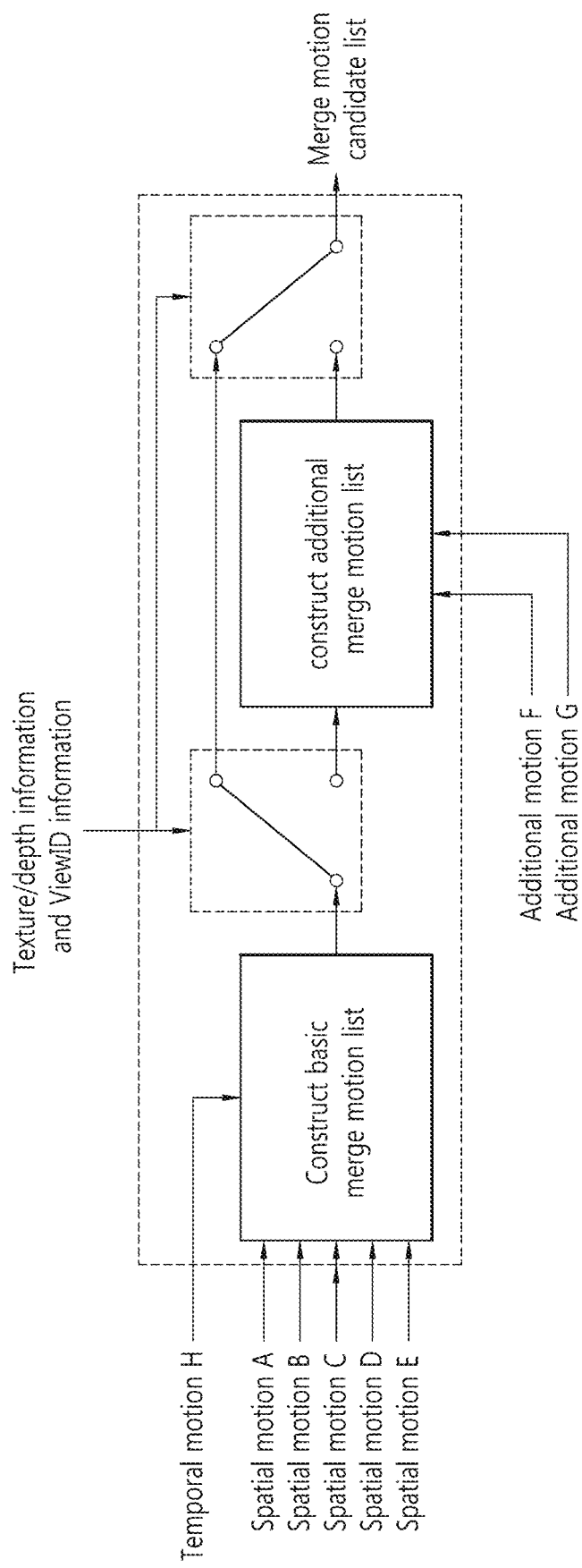
FIG. 14 illustrates hardware for implementing a merge motion candidate list constructing method according to an embodiment of the present invention.

FIG. 14 illustrates hardware for implementing a merge motion candidate list constructing method according to an embodiment of the present invention.

As shown in FIG. 14, input parameters in constructing a merge motion list for a texture view from view 0 include spatial motion A corresponding to spatial motion information on block A, spatial motion B corresponding to spatial motion information on block B, spatial motion C corresponding to spatial motion information on block C, spatial motion D corresponding to spatial motion information on block D, spatial motion E corresponding to spatial motion information on block E, and spatial motion H corresponding to spatial motion information on block H, shown in FIG. 9.

In this process, a basic merge motion candidate list for the texture view from view 0 is output, and an extended merge motion candidate list for texture views and depth views from view 1 and view 2 is output.

First, a process of constructing the basic merge motion list is carried out using neighboring blocks A, B, C, D and E and a collocated candidate block H or M of FIG. 9, and accordingly the basic merge motion candidate list is output.

Next, a process of constructing an additional merge motion list is additionally carried out based on information (texture/depth information) specifying whether a current PU picture is a texture view or depth view and view information (ViewID information). That is, in constructing the merge motion list, the process of constructing the additional merge motion list is additionally carried out for texture views and depth views from view 1 and view 2.

In the process of constructing the additional merge motion list, the basic merge motion candidate list, which is output in the process of constructing the basic merge motion list, additional motion F and additional motion G are input, while the extended merge motion candidate list is output.

In constructing the merge motion candidate list for the texture views and depth views from view 1 and view 2, not a new module but an additional local module is used to reduce hardware implementation complexity. That is, a module for constructing a merge motion candidate list for a base layer (texture view from view 0), realized as a hardware chip, is applied to an enhancement layer (the texture views and depth views from view 1 and view 2) as it is, thereby decreasing hardware implementation complexity.

Figure 15:
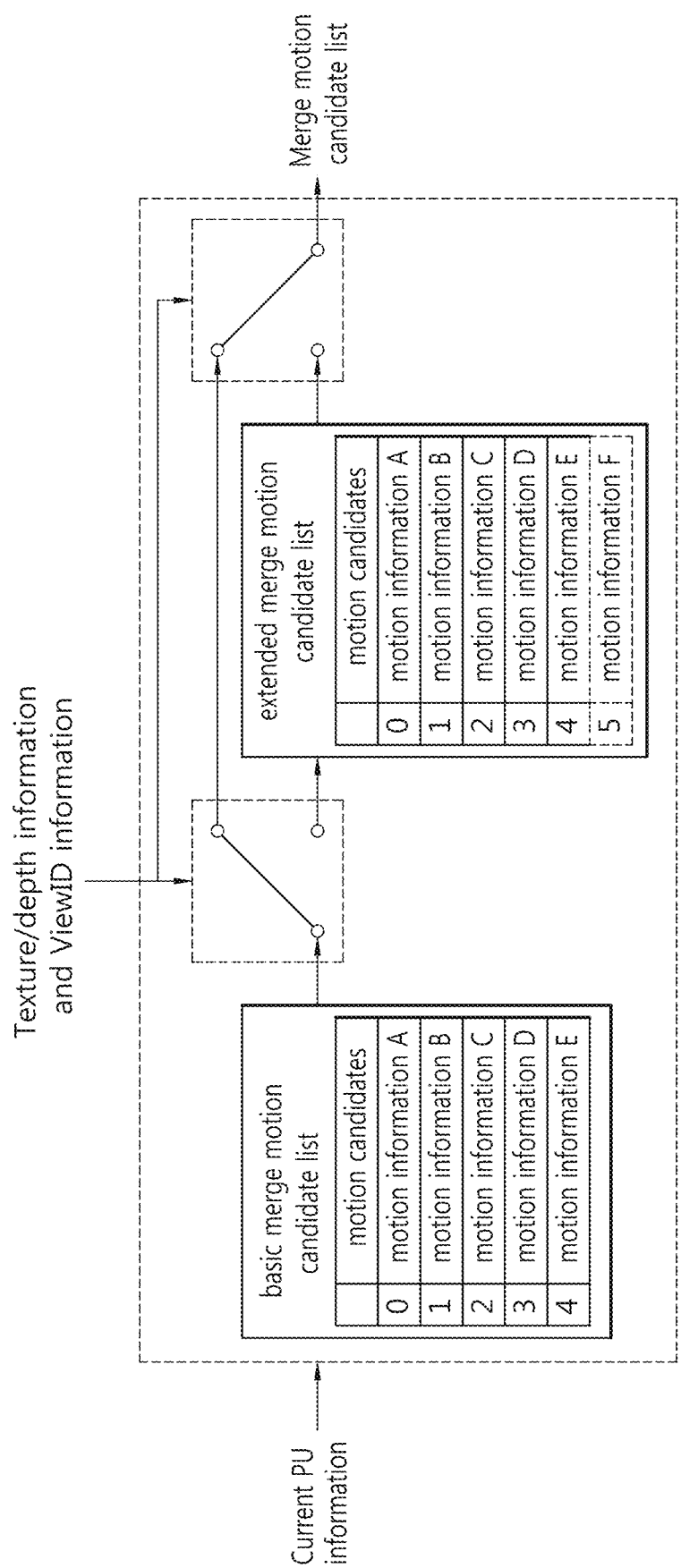
FIG. 15 illustrates a method of constructing a merge motion candidate list according to an embodiment of the present invention.

FIG. 15 illustrates a method of constructing a merge motion candidate list according to an embodiment of the present invention.

When the merge motion candidate list is constructed, current PU information (or picture), information (texture/ depth information) specifying whether the current PU picture is a texture view or depth view, and view information (ViewID information) are input, while a merge motion candidate list for the current PU is output.

First, a basic merge motion candidate list for the current PU is constructed. A known merge motion candidate list constructing method, such as HEVC, may be used to construct the basic merge motion candidate list.

Next, an extended merge motion candidate list is constructed based on the information (texture/depth information) specifying whether the current PU picture is the texture view or depth view and the view information (ViewID information). Here, the extended merge motion candidate list may be constructed with respect to texture views and depth views from view 1 and view 2, in which motion information F may be added to the extended merge motion candidate list.

If the current PU is the texture view from view 0, the basic merge motion candidate list may be output in FIG. 15. If the current PU is the texture views and depth views from view 1 and view 2, the extended merge motion candidate list may be output in FIG. 15. Here, the extended merge motion candidate list may have a greater number of candidates than the basic merge motion candidate list.

Here, a method of constructing the extended merge motion candidate list, that is, a position of an additional motion information to be added to the extended merge motion candidate list, may be set variously.

Figure 16:
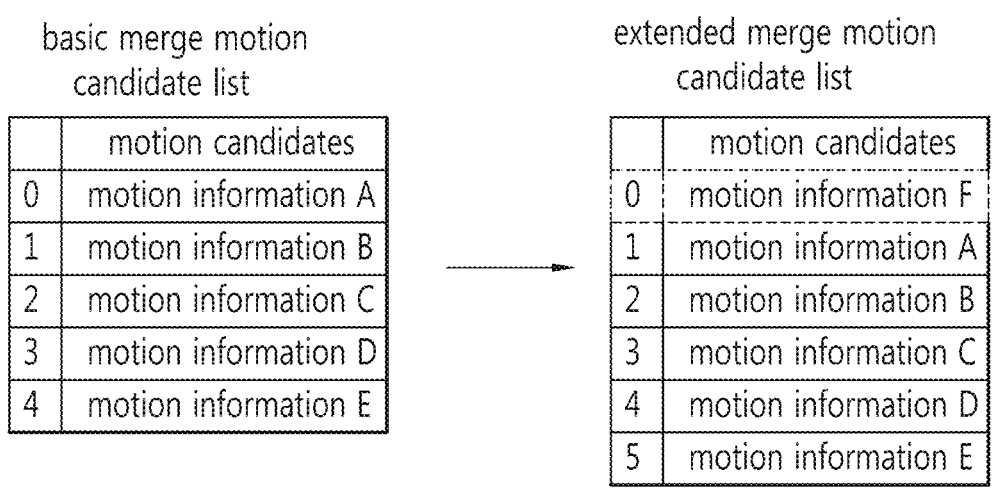
FIG. 16 illustrates a method of constructing an extended merge motion candidate list according to an embodiment of the present invention.

FIG. 16 illustrates a method of constructing an extended merge motion candidate list according to an embodiment of the present invention.

As shown in FIG. 16, additional motion information, for example, motion information F, may be added as a first entry (or an entry at a random position) to a motion candidate list. Here, before adding the additional motion candidate, motion information F as the additional motion candidate is compared with motion information A as a first motion candidate on the basic merge motion candidate list, and if motion candidate F is different from motion information A, motion candidate F may be added the first entry, and vice versa.

In comparing two pieces of motion information, if a difference between two motion vectors is within a threshold, an additional motion candidate may not be added, and vice versa.

Further, an additional motion candidate may be added only if two pieces of motion information have different reference pictures, and vice versa.

Alternatively, motion information F may be added as a last entry on the motion candidate list.

Figure 17:
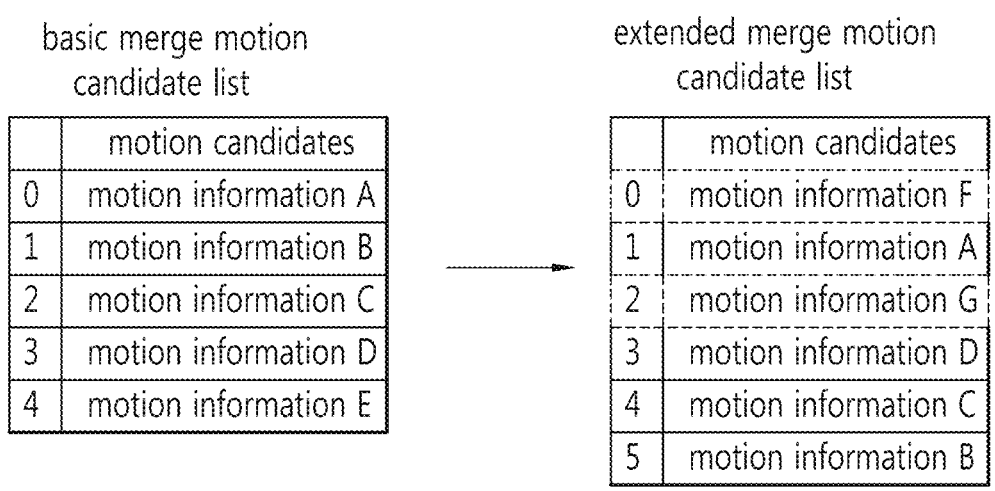
FIG. 17 illustrates a method of constructing an extended merge motion candidate list according to another embodiment of the present invention.

FIG. 17 illustrates a method of constructing an extended merge motion candidate list according to another embodiment of the present invention.

According to the present embodiment, a plurality of pieces of motion information is added. FIG. 17 shows that motion information F and motion information G, which are additional motion information, are added to a motion candidate list.

Motion information F may be added as a first entry (or an entry at a random position) to the motion candidate list, and motion information G as another additional motion information may be added as a third entry (or an entry at a random position) to the motion candidate list.

Here, before adding the additional motion candidates, the additional motion candidates are compared with original entries on the basic merge motion candidate list, and the additional motion candidates may be added to the list only if the additional motion candidates are not the same as the original entries.

In comparing two pieces of motion information, if a difference between two motion vectors is within a threshold, an additional motion candidate may not be added, and vice versa.

Further, an additional motion candidate may be added only if two pieces of motion information have different reference pictures, and vice versa.

Alternatively, motion information F and motion information G may be added as first and second entries or last two entries on the motion candidate list.

Figure 18:
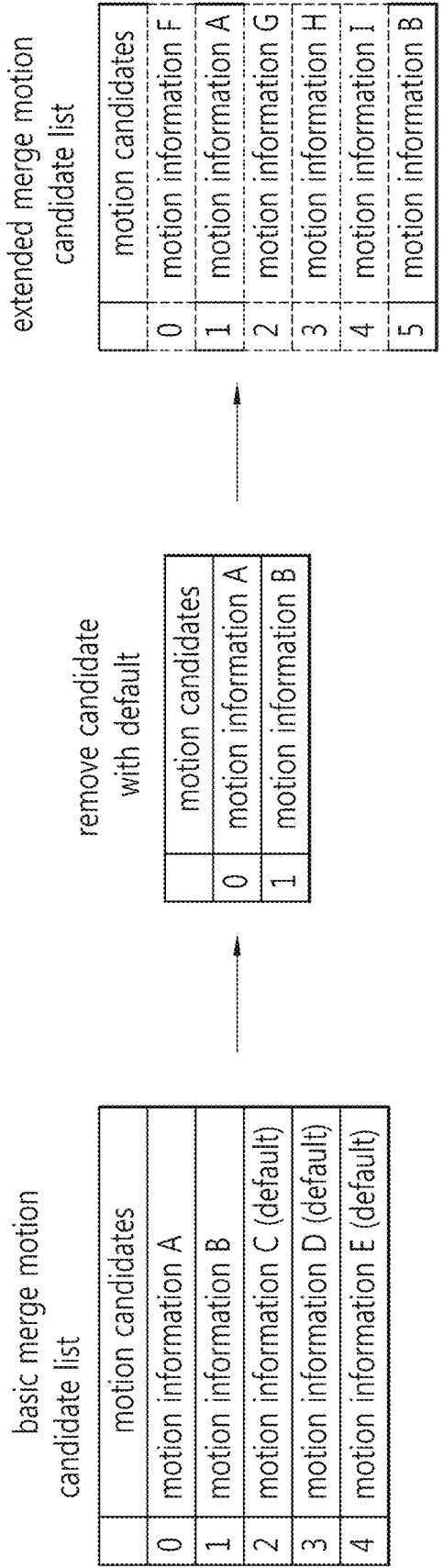
FIG. 18 illustrates a method of constructing an extended merge motion candidate list according to still another embodiment of the present invention.

FIG. 18 illustrates a method of constructing an extended merge motion candidate list according to still another embodiment of the present invention.

In constructing a basic merge motion candidate list, if pieces of motion information derived from neighboring blocks are unavailable for the list, a motion vector of a default may be added to the list.

In this case, as shown in FIG. 18, motion candidates of the default are removed in advance, and additional motion information may be added to the extended merge motion candidate list.

Among entries on the basic merge motion candidate list, motion information C, motion information D and motion information E having the default are removed, while motion information F, motion information G, motion information H and motion information I are added to motion information A and motion information B, thereby constructing the extended merge motion candidate list.

Accordingly, a greater number of additional motion information may be used as a motion candidate.

The video encoding and decoding methods described with reference to FIGS. 12 to 18 may be changed and modified variously.

For example, a basic encoder (or basic module) may be applied not only to a texture view from view 0 but alto to texture views and depth views from view 1 and view 2.

Alternatively, the basic encoder (or basic module) may be applied only to a small block unit with high complexity (for example, 8×8 unit or random-size block). Here, among the texture views and the depth views from view 1 and view 2, a small block or smaller may be encoded using the basic encoder (or basic module), and a block larger than the small block may be encoded using the basic encoder (basic module) and a local encoder (or extended module). The basic encoder (or basic module) may refer to a component for constructing the basic merge motion list in FIGS. 13 and 15, and the local encoder (or extended module) may refer to a component for constructing the additional merge motion list in FIGS. and to 15.

Figure 19:
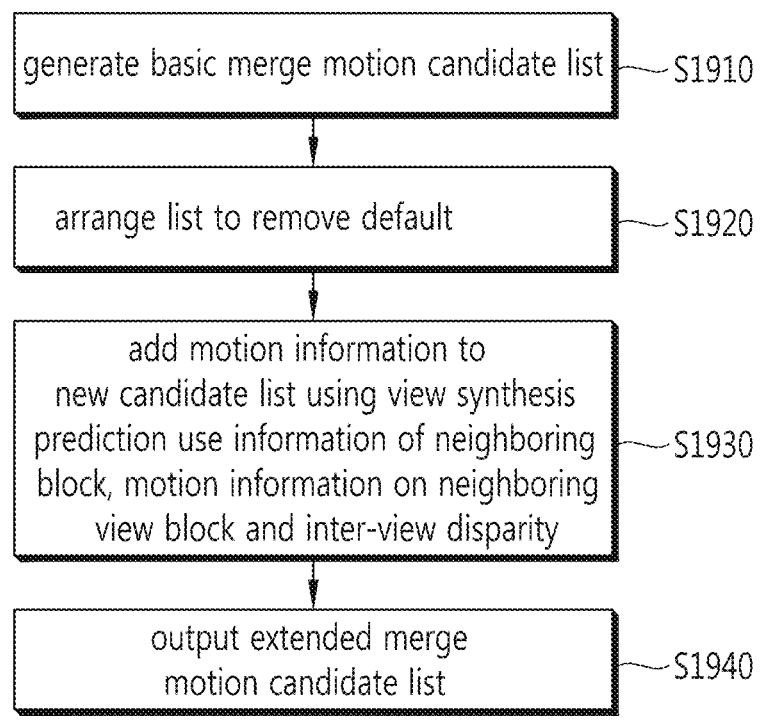
FIG. 19 is a flowchart illustrating construction of an extended motion merge candidate list according to an embodiment of the present invention.

FIG. 19 is a flowchart illustrating construction of an extended motion merge candidate list according to an embodiment of the present invention.

First, a basic merge motion candidate list is generated (S1910).

Then, list arrangement is carried out to remove a default from the basic merge motion candidate list (S1920).

Finally, additional information needed for a 3D picture is added to the list using view synthesis prediction use information of a neighboring block, motion information on a neighboring view block and an inter-view disparity (S1930), thereby outputting an extended merge motion candidate list (S1940).

FIGS. 20 to 24 are flowcharts illustrating a method of constructing an extended merge motion candidate list according to an embodiment of the present invention.

L represents a finally output merge motion candidate list, which is acquired through a process of constructing the extended merge motion candidate list using a basic merge motion candidate list as an input, the basic merge motion candidate list being constructed via constructing the basic merge motion candidate list, that is, deriving spatial motion information (A1, . . . , B2) and deriving temporal motion information (temporal candidate).

AvailableA1 represents whether motion information on a left block A1 of a current block is available as a candidate, AvailableB1 represents whether motion information on an upper block B1 of the current block is available as a candidate, and AvailableB0 represents whether motion information on a top right block B0 of the current block is available as a candidate.

nS represents a number of candidates included in L among motion candidates of the left block A1, the upper block B1, and the top right block B0, and nB represents a number of basic merge motion candidates among the motion candidates included in L. nE represents a number of newly added candidates when constructing the extended merge motion candidate list.

A view synthesis prediction (VSP) list represents whether motion information uses VSP.

Figure 20:
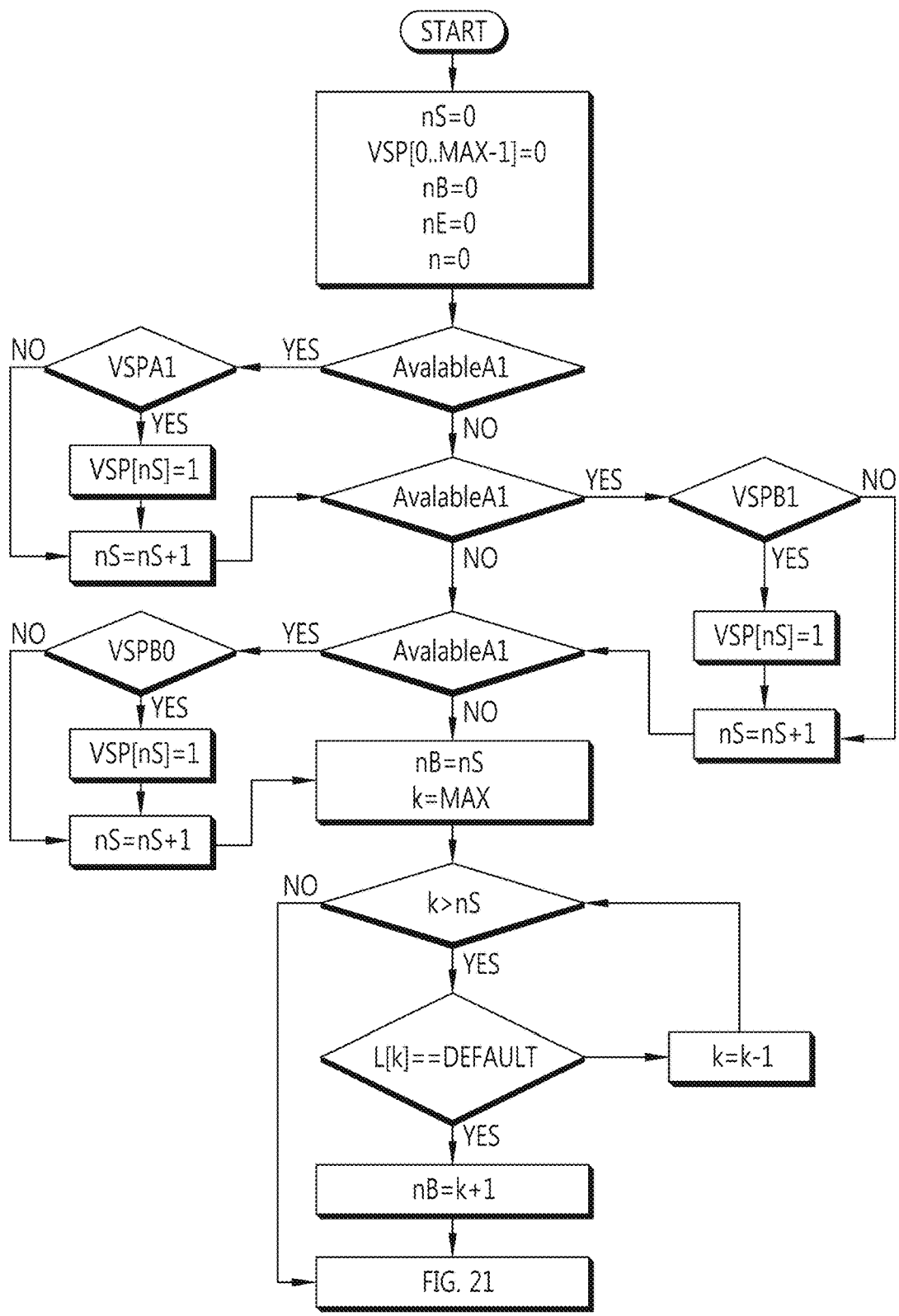
FIG. 20 is a flowchart illustrating a method of constructing an extended merge motion candidate list according to an embodiment of the present invention.

FIG. 20 determines whether spatial motion information among the motion information currently included in L is derived through VSP.

As shown in FIG. 20, if the motion information on the left block A1, the motion information on the upper block B1, and the motion information on the top right block B0 are derived using VSP, a value of the VSP list (VPS[ ]) is changed to 1. Then, a number of pieces of motion information which are not a default is set to nB while scanning through L backwards. For example, if list L includes A1, B1, B0, DEFAULT, DEFAULT and DEFAULT, nB is 3.

Although not shown, it may also be determined whether motion information on a bottom left block A0 and motion information on a top left block B2 are derived using VSP among the spatial motion candidates forming the basic merge motion candidate list.

Figure 21:
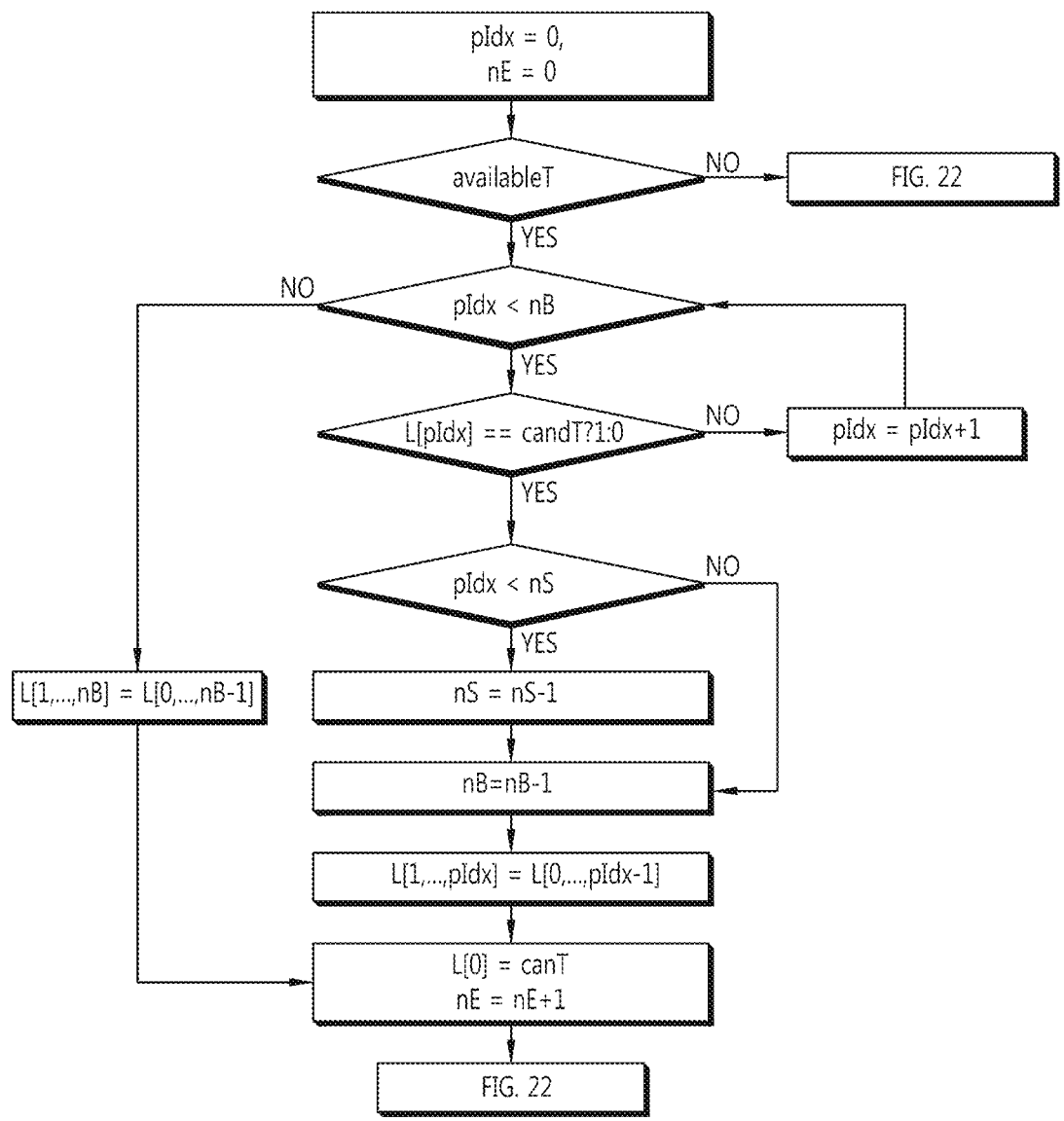
FIG. 21 is a flowchart using temporal motion information, subsequent to FIG. 20 according to an embodiment of the present invention.

FIG. 21 is a flowchart using temporal motion information, subsequent to FIG. 20, according to an embodiment of the present invention. In FIG. 21, motion information on a picture block corresponding to a current depth block may be added to the merge motion candidate list.

First, a search index pIdx of L is set to 0, and an extended candidate index nE is initialized to 0.

AvailableT represents whether motion information on a collocated picture block is available as a candidate when a depth map is encoded, and candT represents the motion information on the picture block corresponding to the current depth block.

If AvailableT is 1 and motion information among L[0] to L[nB−1] overlaps with candT, defining an overlapping position as pIdx, an L[pIdx−1] value is shifted by one cell to the right from L[0] and candT is added to an L[0] position. That is, if motion information forming a basic merge extended list and candT are the same, a first entry to a collocated entry of the merge extended list are shifted to one next cells, and candT is added to the L[0] position. When candT is added to L, nE representing the number of newly added candidates is increased by 1.

Here, if the overlapping position pIdx of the motion information among L[0] to L[nB−1] and candT is smaller than nS, nS and nB are reduced by 1. Otherwise, only nB is reduced by 1.

If AvailableT is 1 and a motion candidate overlapping with candT is absent among L[0] to L[nB−1], L[0] to L[nB−1] are shifted by one cell to the right, candT is added to the L[0] position, and nE is increased by 1.

Figure 22:
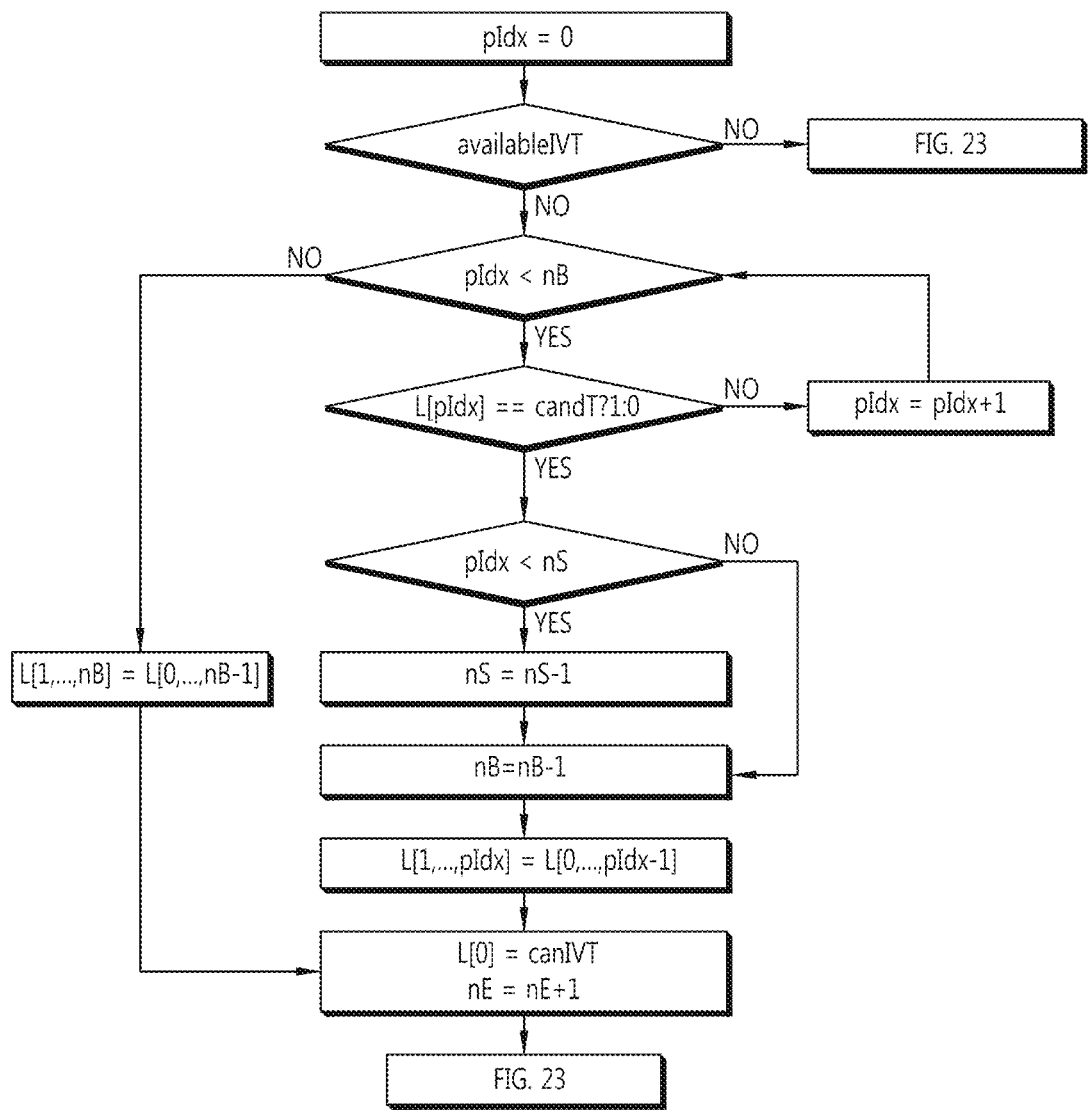
FIG. 22 is a flowchart using inter-view motion information, subsequent to FIG. 21, according to an embodiment of the present invention.

In FIG. 21, if AvailableT is 0, that is, the motion information on the picture block corresponding to the current depth block is unavailable, a process illustrated in FIG. 22 is carried out. FIG. 22 is a flowchart using inter-view motion information, subsequent to FIG. 21, according to an embodiment of the present invention.

In FIG. 22, motion information (temporal inter-view motion information) on a neighboring view block corresponding to a current block may be added to the merge motion candidate list.

First, the search index pIdx of L is set to 0 and the extended candidate index nE is initialized to 0.

AvailableIVT represents whether the motion information (temporal inter-view motion information) on the neighboring view block corresponding to the current block is available as a candidate, and candIVT represents the motion information on the neighboring view block.

If AvailableIVT is 1 and motion information among L[0] to L[nB−1] overlaps with candIVT, defining an overlapping position as pIdx, the L[pIdx−1] value is shifted by one cell to the right from L[0] and candIVT is added to the L[0] position. That is, if motion information forming the basic merge extended list and candIVT are the same, the first entry to the collocated entry of the merge extended list are shifted to one next cells, and candIVT is added to the L[0] position. When candIVT is added to L, nE representing the number of newly added candidates is increased by 1.

Here, if the overlapping position pIdx of the motion information among L[0] to L[nB−1] and candIVT is smaller than nS, nS and nB are reduced by 1. Otherwise, only nB is reduced by 1.

If AvailableIVT is 1 and a motion candidate overlapping with candIVT is absent among L[0] to L[nB−1], L[0] to L[nB−1] are shifted by one cell to the right, candIVT is added to the L[0] position, and nE is increased by 1.

Figure 23:
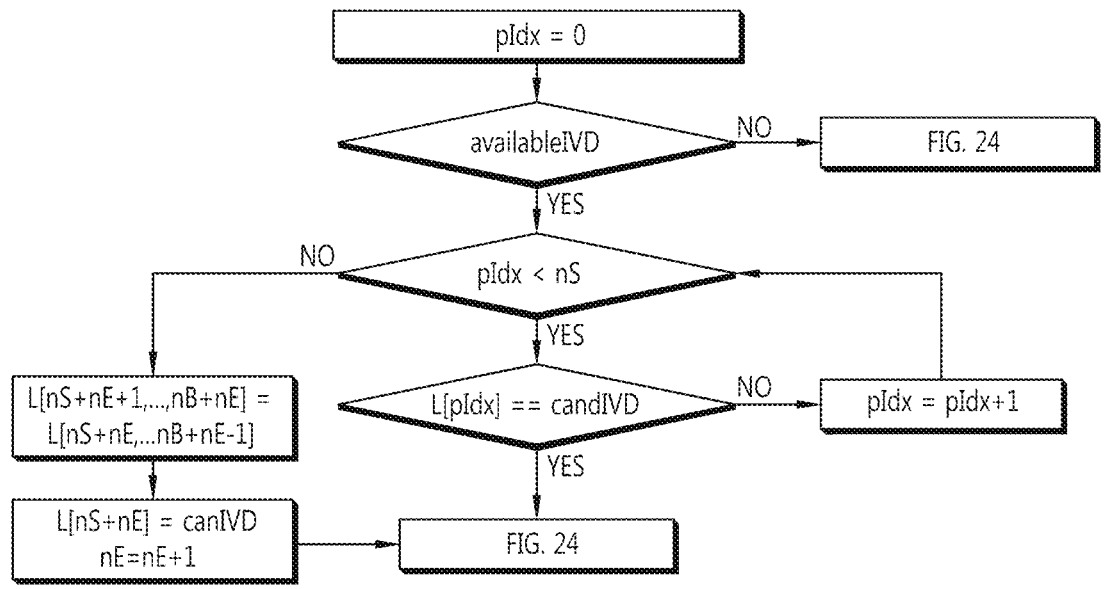
FIG. 23 is a flowchart using an inter-view disparity, subsequent to FIG. 22, according to an embodiment of the present invention.

FIG. 23 is a flowchart using an inter-view disparity, subsequent to FIG. 22, according to an embodiment of the present invention.

In FIG. 23, an inter-view disparity may be added to the merge motion candidate list.

AvailableIVD represents whether an inter-view disparity is available as motion information, and candIVD represents an inter-view disparity derived from different views.

If AvailableIVD is 1 and a candidate overlapping with candIVD is absent among L[0] to L[nS−1], L[nS+nE] to L[nB+nE−1] are shifted by one cell to the right, candIVD is added to an L[nS+nE] position, and nE is increased by 1.

That is, the inter-view disparity may be added to a position next to a spatial motion candidate included in the basic merge motion candidate list.

Figure 24:
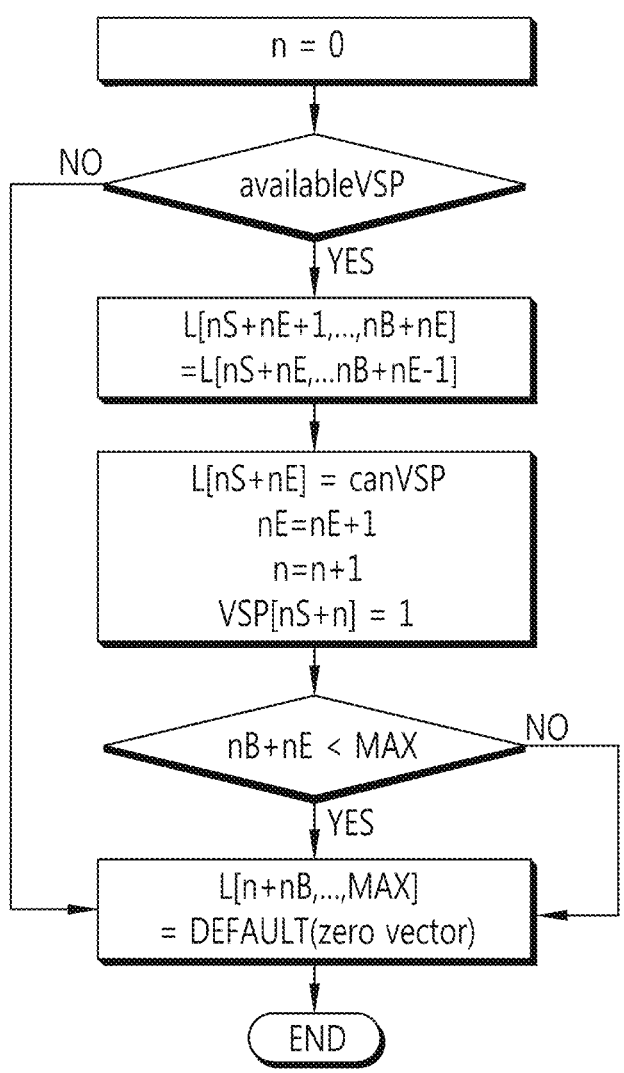
FIG. 24 is a flowchart using temporal motion information, subsequent to FIG. 23, according to an embodiment of the present invention.

FIG. 24 is a flowchart using temporal motion information, subsequent to FIG. 23, according to an embodiment of the present invention.

In FIG. 23, an inter-view disparity may be added to the merge motion candidate list.

First, parameter n is initialized to 0 for VPS indexing. AvailableVSP represents whether inter-view prediction is available to a current block. CandVSP represents motion information by a VSP mode.

MAX represents a maximum number of motion candidates forming the extended merge motion list, for example, 6.

If AvailableVSP is 1, L[nS+nE] to L[nS+nE−1] are shifted by one cell to the right, candVSP is added to an L[nS+nE] position, VSP[nS+nE] is changed to 1, and nE is increased by 1. That is, candVSP may be added to a position next to a spatial motion candidate included in the basic merge motion candidate list.

Subsequently, if n+nB is smaller than MAX, L[n+nB] to L[MAX−1] are set to a default. As an example of the default, a zero vector as a motion vector may be added to the merge motion candidate list.

The foregoing video encoding and decoding methods may employ HEVC being jointly developed by the MPEG and VCEG. Thus, application ranges of the video encoding and decoding methods may vary depending on a block size, coding unit (CU) depth or transform unit (TU) depth as illustrated in Table 1.

TABLE 1

| CU (or PU or TU) depth representing application range | Mode A | Mode B | Mode C |
|---|---|---|---|
| 0 | X | O | X |
| 1 | X | O | X |
| 2 | O | O | O |
| 3 | O | X | X |
| 4 or greater | O | X | X |

Table 1 illustrates modes of determining application ranges of the encoding and decoding methods when a given CU (or TU) depth is 2. "0" indicates that the encoding and decoding methods of the present invention are applied at the corresponding depth, and "1" indicates that the encoding and decoding methods of the present invention are not applied at the corresponding depth.

When the application ranges change on the CU depth, there are an application mode (mode A) at a given depth or greater, an application mode (mode B) at a given depth or smaller, and an application mode (mode C) only at a given depth, as shown in Table 1.

A mode of not applying the methods of the present invention at any depth may be indicated using a flag, or a CU depth value greater by one than a maximum value of a CU depth may be signalled.

A parameter (that is, size or depth information) determining the application ranges may be set to a predetermined value for the encoding apparatus and the decoding apparatus or to a value determined based on a profile or level. Alternatively, the encoding apparatus transmits a parameter value included in a bit stream, and the decoding apparatus may derive the parameter value from the bit stream.

Application of the foregoing methods may be signalled, being included in a bit stream, and be expressed in the following syntax elements in a sequence parameter set (SPS), a picture parameter set (PPS) or a slice header, which are shown in Tables 2 to 5.

TABLE 2

| seq_parameter_set_rbsp( ) { | Descriptor |
|---|---|
| profile_idc | u(8) |
| reserved_zero_8bits /* equal to 0 */ | u(8) |
| level_idc | u(8) |
| ... | ue(v) |
| reuse_enabled_flag | u(1) |
| if(reuse _enabled_flag) | |
| reuse_disabled_info | ue(v) |
| ... | |

TABLE 3

| pic_parameter_set_rbsp( ) { | Descriptor |
|---|---|
| pic_parameter_set_id | ue(v) |
| seq_parameter_set_id | ue(v) |
| entropy_coding_mode_flag | u(1) |
| ... | |
| reuse_enabled_flag | u(1) |
| if(reuse _enabled_flag) | |
| reuse_disabled_info | ue(v) |
| ... | |

TABLE 4

| slice_header( ) { | Descriptor |
|---|---|
| slice_type | ue(v) |
| pic_parameter_set_id | ue(v) |
| frame_num | u(v) |
| ... | |
| reuse_enabled_flag | u(1) |
| if(reuse _enabled_flag) | |
| reuse_disabled_info | ue(v) |
| ... | |

TABLE 5

| slice_header( ) { | Descriptor |
|---|---|
| lightweight_slice_flag | u(1) |
| if( !lightweight_slice_flag) { | |
| slice_type | ue(v) |
| pic_parameter_set_id | ue(v) |
| frame_num | u(v) |
| ... | |
| } | |
| if( entropy_coding_mode_flag  &&  slice_type != I) | |
| cabac_init_idc | ue(v) |
| first_slice_in_pic_flag | u(1) |
| ... | |
| reuse_enabled_flag | u(1) |
| if(reuse _enabled_flag) | |
| reuse_disabled_info | ue(v) |
| ... | | reuse_enabled_flag indicates whether the video encoding and decoding methods of the present invention are applied. reuse_enabled_flag equal to 1 specifies that an encoding/decoding module for a texture view from an independent view (view 0) is reused to encode/decode texture views and depth views from dependent views (view 1 and view 2) (hereinafter, "a proposed method"), and reuse_enabled_flag equal to 0 specifies that the texture views and depth views from the dependent views (view 1 and view 2) are encoded/decoded without reusing the encoding/decoding module for the texture view from the independent view (view 0). An inverse case is also possible.

reuse_disabled_info is a syntax element activated when the proposed method is applied (or reuse_enabled_flag is 1).

reuse_disabled_info may indicate whether the proposed method is applied depending on a CU depth (or CU size, macroblock size, sub-macroblock size or block size). For example, if reuse_disabled_info is equal to 0, the proposed method may be applied to any block size. If reuse_disabled_info is 1, the proposed method may be applied only to a unit larger than a 4×4 block. Alternatively, if reuse_disabled_info is 2, the proposed method may be applied only to a unit larger than an 8×8 block.

Inverse cases may be also possible. For instance, if reuse_disabled_info is 1, the proposed method may be applied only to a unit smaller than a 4×4 block. That is, various application methods may be signalled using reuse_disabled_info.

Application of the proposed method may be determined by picture (or frame) using signaling. Alternatively, the proposed method may be applied only to a P picture (frame) or B picture (frame).

The foregoing suggested methods may be employed not only for the 3D video codec but also for a scalable video codec. In one embodiment, the same encoding/decoding module used for a base layer in the scalable video codec may be applied to an enhancement layer, after which a local encoding/decoding module is additionally used to encode/decode the enhancement layer. For example, the same basic merge motion list constructing module used for the base layer in the scalable video codec is applied to the enhancement layer to construct a basic merge motion candidate list, after which the basic merge motion candidate list is reset (changed) by using an additional merge motion list constructing module to construct an extended merge motion candidate list.

As described above, the present invention applies a module used for encoding a texture view from an independent view, which provides backward compatibility, to texture views and depth views from dependent views as it is to thereby reduce implementation complexity, while additionally applying a local encoder to the texture views and depth views from the dependent views to thereby improve encoding efficiency.

In the aforementioned embodiments, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

The foregoing embodiments include various aspects of examples. Although all possible combinations to illustrate various aspects may not described herein, it will be understood by those skilled in the art that various combinations may be made therein without departing from the spirit and scope of the invention as defined by the appended claims. Therefore, all differences, changes and modifications within the scope will be construed as being included in the present invention.

The invention claimed is:

1. A processor-implemented method of decoding a video comprising views, the method comprising:
   constructing a basic merge motion candidate list for an independent view using motion information on a spatial neighboring block to a current block and motion information on a collocated block in a temporal reference picture;
   determining whether a picture to which the current block belongs is a depth map information picture or a dependent view picture;
   in response to the determining, constructing an extended merge motion candidate list based on the basic merge motion candidate list using information on a view identifier of a dependent view or information on the depth map;
   performing motion prediction for the current block using at least one of the basic merge motion candidate list and the extended merge motion candidate list; and
   decoding the video comprising the views based on the motion prediction.

2. The method of claim 1, wherein the extended merge motion candidate list comprises any one or any combination of two or more of information on a block of a different view corresponding to the current block, view synthesis prediction information, and inter-view disparity information.

3. The method of claim 1, wherein, the constructing of the extended merge motion candidate list further comprises:
   adding motion information (candT) on a collocated picture block with the current block when the depth map is encoded,
   wherein the adding of the candT comprises determining an availability of the candT and adding the candT to the extended merge motion candidate list as a first candidate in response to the candT being determined available.

4. The method of claim 1, wherein, the constructing of the extended merge motion candidate list further comprises:
   adding motion information (candIVT) on a neighboring view block corresponding to the current block,
   wherein the adding of the candIVT comprises determining availability of the candIVT and adding the candIVT to the extended merge motion candidate list as a first candidate in response to the candIVT being determined available.

5. The method of claim 1, wherein, the constructing of the extended merge motion candidate list further comprises:
   adding inter-view disparity information (candIVD),
   wherein the adding of the candIVD comprises determining availability of the candIVD and adding the candIVD to the extended merge motion candidate list after the motion information on the neighboring block in response to the candIVD being determined available.

6. The method of claim 1, wherein, the constructing of the extended merge motion candidate list further comprises:
   adding motion information (candVSP) by a view synthesis prediction and the adding of the candVSP comprises determining availability of the candVSP, and adding the candVSP to the extended merge motion candidate list after the motion information on the neighboring block in response to the candVSP being determined available.

7. The method of claim 1, further comprising determining whether motion information on the neighboring block comprised in the basic merge motion candidate list is generated using view synthesis prediction.

8. An apparatus for decoding a video comprising views, the apparatus comprising:
   one or more processors configured to:
   construct a basic merge motion candidate list using motion information on a spatial neighboring block to a current block and motion information on a collocated block in a temporal reference picture; and
   construct an extended merge motion candidate list based on the basic merge motion candidate list using motion information on a view picture different from the current block or motion information on a depth map, wherein the extended merge motion candidate list is constructed according to a determination that a picture to which the current block belongs is a depth map information picture or a dependent view picture, and wherein the apparatus is configured to perform motion prediction for the current block using at least one of the basic merge motion candidate list and the extended merge motion candidate list, and to decode the video comprising the views based on the motion prediction.

9. The apparatus of claim 8, wherein the extended merge motion candidate list comprises any one or any combination of two or more of information on a block of a different view corresponding to the current block, view synthesis prediction information, and inter-view disparity information.

10. The apparatus of claim 8, wherein, for the construction of the extended merge motion candidate list, the one or more processors are further configured to add motion information (candT) on a collocated picture block with the current block in response to the depth map being encoded, and wherein for the adding of the candT, the one or more processors are further configured to determine availability of the candT and add the candT to the extended merge motion candidate list as a first candidate in response to the candT being determined available.

11. The apparatus of claim 8, wherein, for the construction of the extended merge motion candidate list, the one or more processors are further configured to add motion information (candIVT) on a neighboring view block corresponding to the current block, and wherein for the adding of the candIVT, the one or more processors are configured to determine availability of the candIVT, and add the candIVT to the extended merge motion candidate list as a first candidate in response to the candIVT being determined available.

12. The apparatus of claim 8, wherein, for the construction of the extended merge motion candidate list, the one or more processors are further configured to add inter-view disparity information (candIVD), and wherein for the adding of the candIVD, the one or more processors are configured to determine availability of the candIVD, and add the candIVD to the extended merge motion candidate list after the motion information on the neighboring block in response to the candIVD being determined available.

13. The apparatus of claim 8, wherein, for the construction of the extended merge motion candidate list, the one or more processors are further configured to add motion information (candVSP) by a view synthesis prediction, and wherein for the adding of the candVSP the one or more processors are configured to determine availability of the candVSP, and add the candVSP to the extended merge motion candidate list after the motion information on the neighboring block in response to the candVSP being determined available.

14. The apparatus of claim 8, wherein, for the construction of the extended merge motion candidate list, the one or more processors are configured to determine whether motion information on the neighboring block comprised in the basic merge motion candidate list is generated using view synthesis prediction.

15. A processor-implemented method of encoding a video comprising views, the method comprising:

constructing a basic merge motion candidate list for an independent view using motion information on a spatial neighboring block to a current block and motion information on a collocated block in a temporal reference picture;

determining whether a picture to which the current block belongs is a depth map information picture or a dependent view picture;

in response to the determining, constructing an extended merge motion candidate list based on the basic merge motion candidate list using information on a view identifier of a dependent view or information on the depth map;

performing motion prediction for the current block using at least one of the basic merge motion candidate list and extended merge motion candidate list; and encoding the video comprising the views based on the motion prediction.

16. The method of claim 15, wherein the extended merge motion candidate list comprises any one or any combination of two or more of information on a block of a different view corresponding to the current block, view synthesis prediction information, and inter-view disparity information.

17. The method of claim 15, wherein, the constructing of the extended merge motion candidate list further comprises:

adding motion information (candT) on a collocated picture block with the current block when the depth map is encoded, wherein the adding of the candT comprises determining availability of the candT, and adding the candT to the extended merge motion candidate list as a first candidate in response to the candT being determined available.

18. The method of claim 15, wherein the constructing of the extended merge motion candidate list further comprises;

adding motion information (candIVT) on a neighboring view block corresponding to the current block, wherein the adding of the candIVT comprises determining availability of the candIVT, and adding the candIVT to the extended merge motion candidate list as a first candidate in response to the candIVT being determined available.

19. The method of claim 15, wherein the constructing of the extended merge motion candidate list further comprises:

adding inter-view disparity information (candIVD), wherein the adding of the candIVD comprises determining availability of the candIVD, and adding the candIVD to the extended merge motion candidate list after the motion information on the neighboring block in response to the candIVD being determined available.

20. The method of claim 15, wherein the constructing of the extended merge motion candidate list further comprises:

adding motion information (candVSP) by a view synthesis prediction, wherein the adding of the candVSP comprises determining availability of the candVSP, and adding the candVSP to the extended merge motion candidate list after the motion information on the neighboring block in response to the candVSP being determined available.

* * * * *